(12) United States Patent
Klukowski et al.

(10) Patent No.: US 7,387,045 B2
(45) Date of Patent: Jun. 17, 2008

(54) ADJUSTABLE STEERING COLUMN

(75) Inventors: Christoph Klukowski, Walenstadt (CH); Robert Galehr, Ludesch (AT); Reinhard Bertsch, Röthis (AT); Reto Umberg, Flums (CH); Hubert Breuss, Gisingen (AT); Christian Lutz, Nüziders (AT)

(73) Assignee: ThyssenKrupp Presta Aktiengesellschaft, Furstentum (LI)

( * ) Notice: Subject to any disclaimer, the term of this patent is extended or adjusted under 35 U.S.C. 154(b) by 505 days.

(21) Appl. No.: 10/720,066

(22) Filed: Nov. 25, 2003

(65) Prior Publication Data

US 2004/0155448 A1  Aug. 12, 2004

(30) Foreign Application Priority Data

Dec. 23, 2002  (DE) ................ 102 61 538

(51) Int. Cl.
*B62D 1/18* (2006.01)
(52) U.S. Cl. ....................... 74/493; 280/775
(58) Field of Classification Search ............. 74/492, 74/493, 495, 497, 527, 531, 529, 504, 510; 280/775, 777, 779
See application file for complete search history.

(56) References Cited

U.S. PATENT DOCUMENTS

| | | | |
|---|---|---|---|
| 4,554,843 A | | 11/1985 | Anderson |
| 4,732,050 A | * | 3/1988 | Vollmer ....................... 74/493 |
| 5,338,064 A | * | 8/1994 | Sadakata et al. ............ 280/775 |
| 5,857,703 A | * | 1/1999 | Kinoshita et al. ........... 280/775 |
| 5,988,679 A | | 11/1999 | Schelling et al. |
| 6,073,965 A | | 6/2000 | Kinoshita et al. |
| 6,089,780 A | * | 7/2000 | Lutz ....................... 403/322.1 |
| 6,092,955 A | | 7/2000 | Chartrain et al. |
| 6,092,957 A | * | 7/2000 | Fevre et al. ................ 403/373 |
| 6,095,012 A | * | 8/2000 | Lutz ........................... 74/493 |
| 6,419,269 B1 | * | 7/2002 | Manwaring et al. ........ 280/775 |
| 6,616,185 B2 | * | 9/2003 | Manwaring et al. ........ 280/775 |

(Continued)

FOREIGN PATENT DOCUMENTS

DE  19542472 C1  2/1997

(Continued)

*Primary Examiner*—Richard W L Ridley
*Assistant Examiner*—Terence Boes
(74) *Attorney, Agent, or Firm*—Wenderoth, Lind & Ponack, L.L.P.

(57) ABSTRACT

An adjustable steering column includes a steering spindle (1), a shell unit (3) bearing the steering spindle (1), a console unit (4), stationary on the chassis, with at least one side wall (5), which extends bilaterally along the shell unit (3) and supports the shell unit (3). The steering column also includes a securement device, which can be opened and closed, in the opened state of which the shell unit (3) is adjustable relative to the console unit (4) at least in one adjustment direction, and which has a tension bolt (11) penetrating openings in the shell unit (3) and in the at least one side wall (5). At least for one adjustment direction at least one tilting part (26) is provided acting in this adjustment direction, wherein in a torsion entailed in a deformation of the steering column of at least the segment, located in the proximity of the side wall (5), of the shell unit (3) relative to the side wall (5), an entrainment of the tilting part (26) takes place and clamping edges (36) and clamping faces (35) come to engage one another, whereby the displaceability of the tilting part (26) in this adjustment direction is inhibited.

28 Claims, 24 Drawing Sheets

U.S. PATENT DOCUMENTS

2002/0171235 A1* 11/2002 Riefe et al. .................. 280/775

FOREIGN PATENT DOCUMENTS

| | | |
|---|---|---|
| DE | 69708037 T2 | 6/2002 |
| DE | 69801871 T2 | 7/2002 |
| EP | 0443881 A2 | 8/1991 |
| EP | 0802104 B1 | 10/1997 |
| EP | 0856451 B1 | 8/1998 |
| EP | 0887245 B1 | 12/1998 |
| EP | 1 093 990 | 4/2001 |
| EP | 1170194 A1 | 1/2002 |
| GB | 2092967 | 8/1982 |
| WO | 97/16337 | 5/1997 |

* cited by examiner

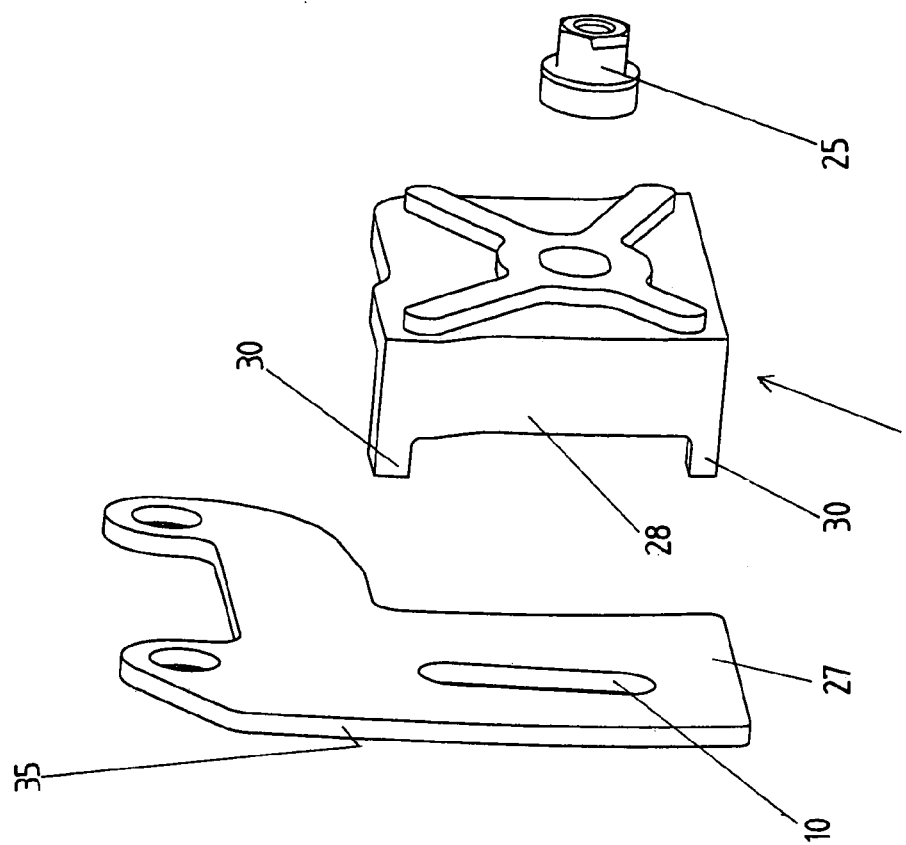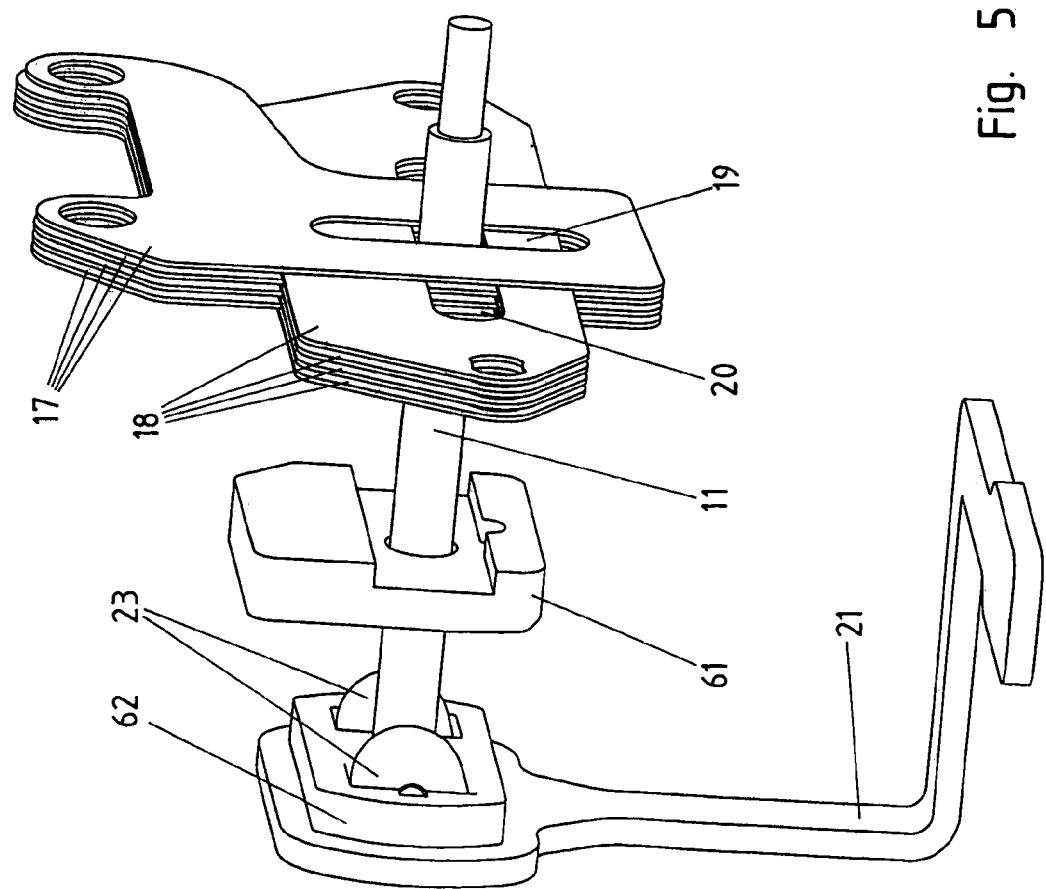
Fig. 5

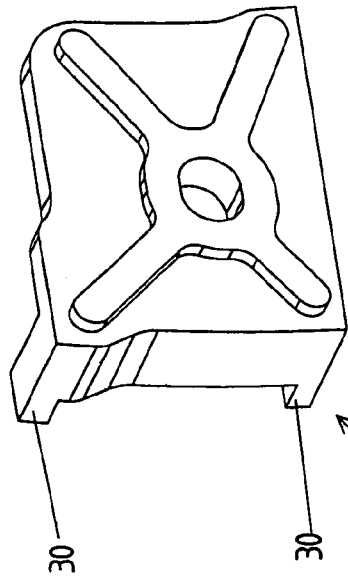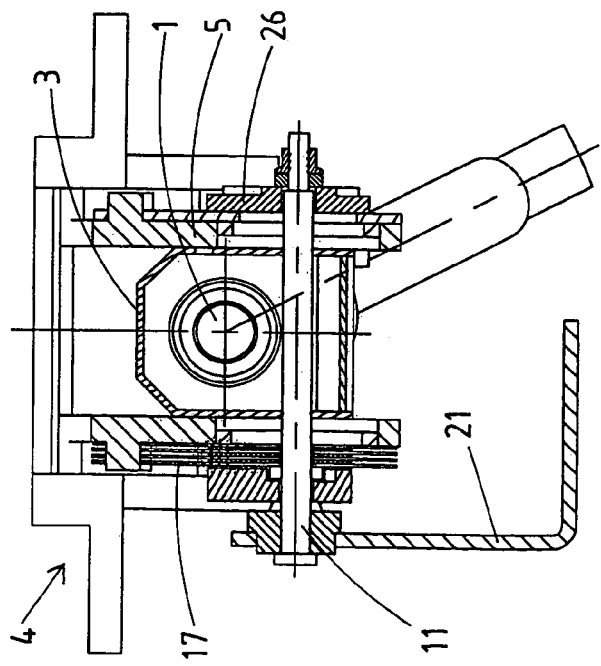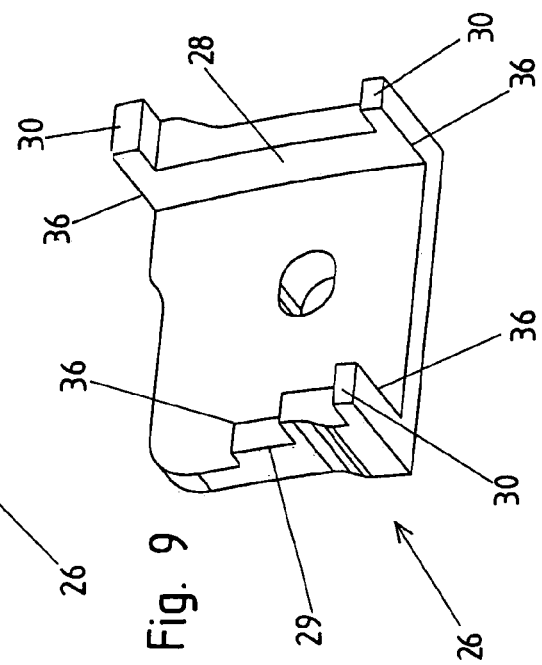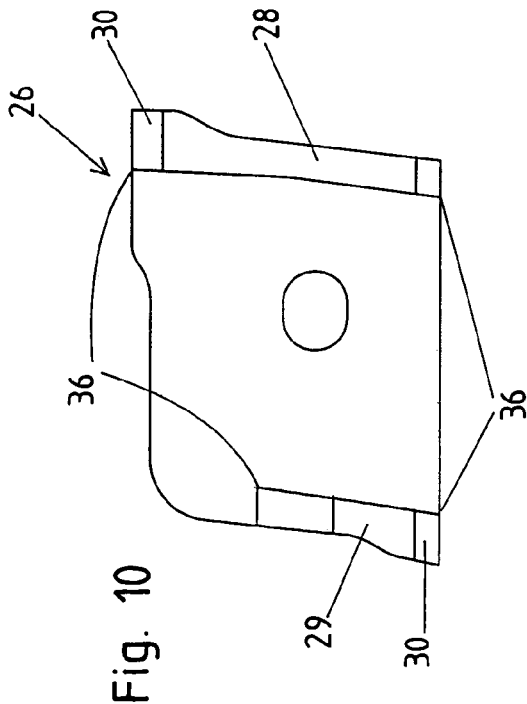

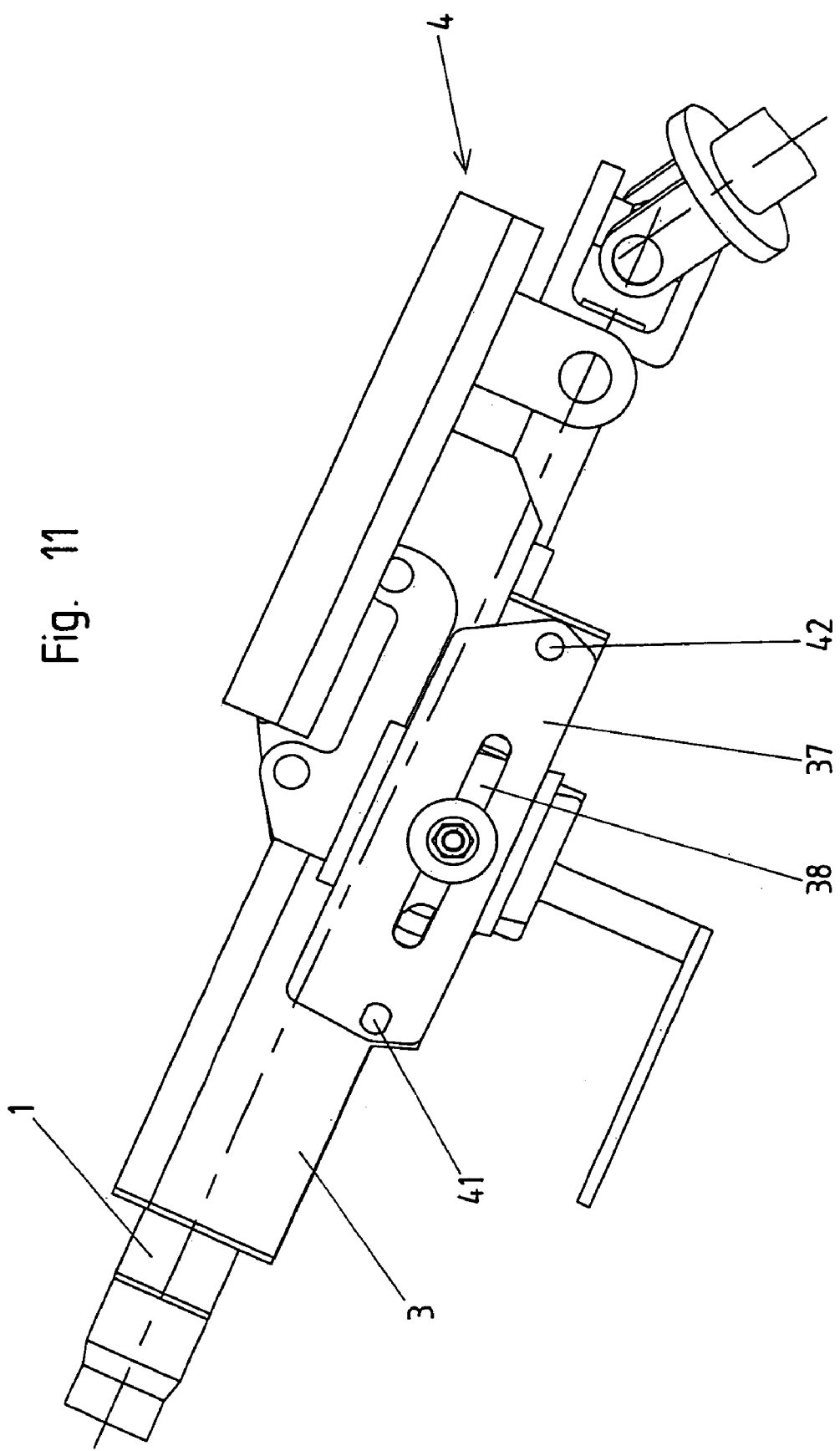

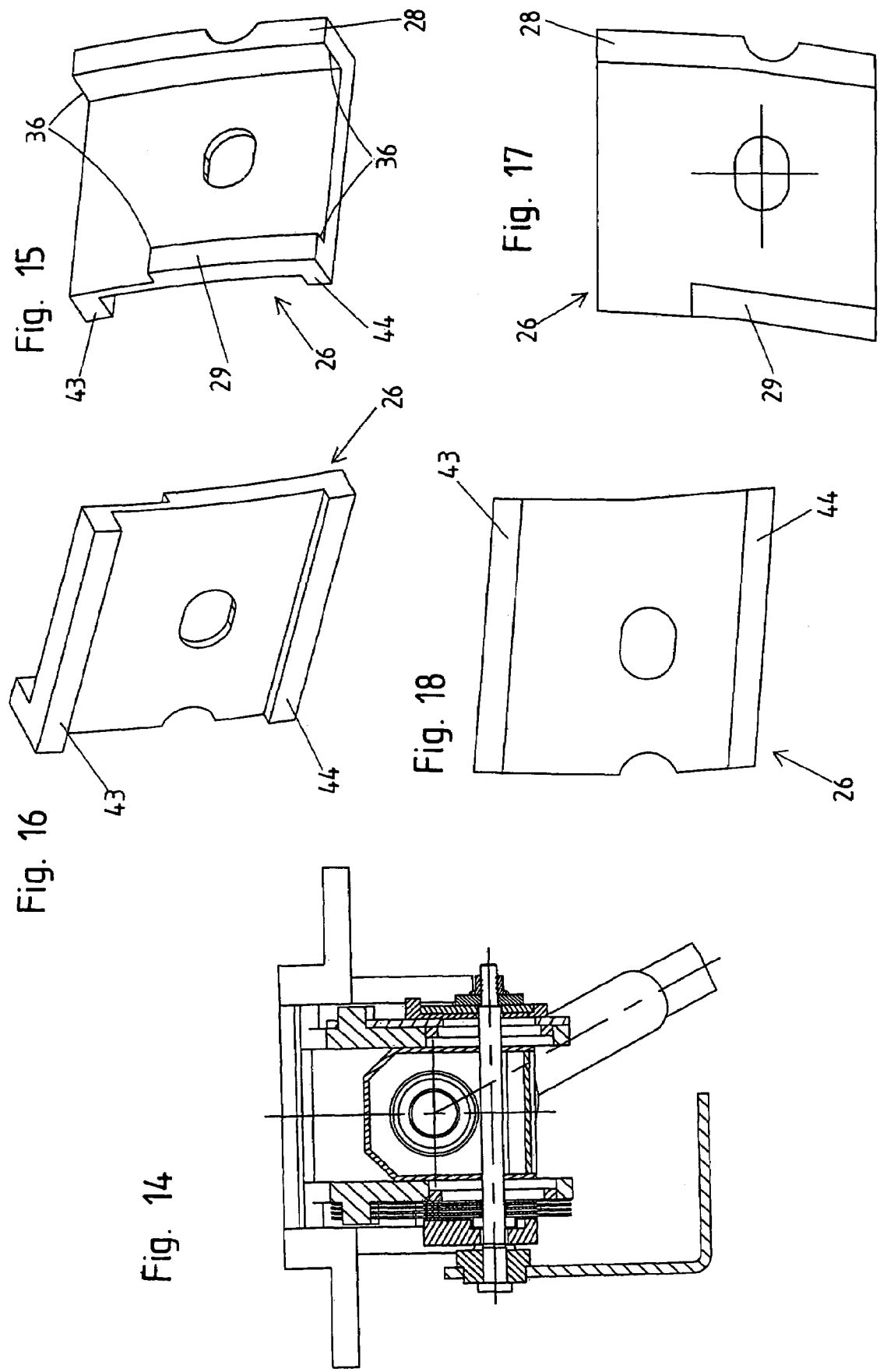

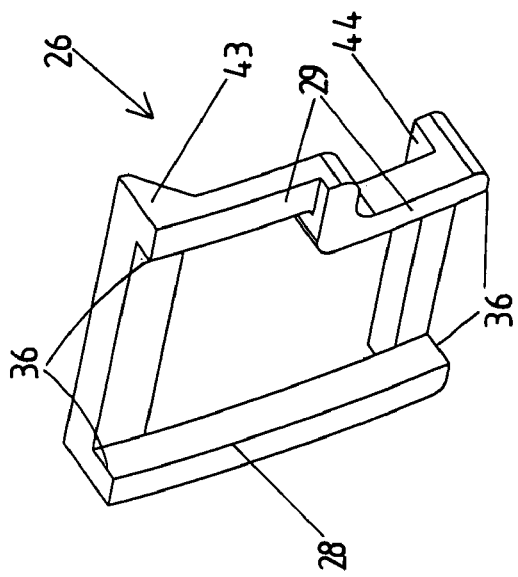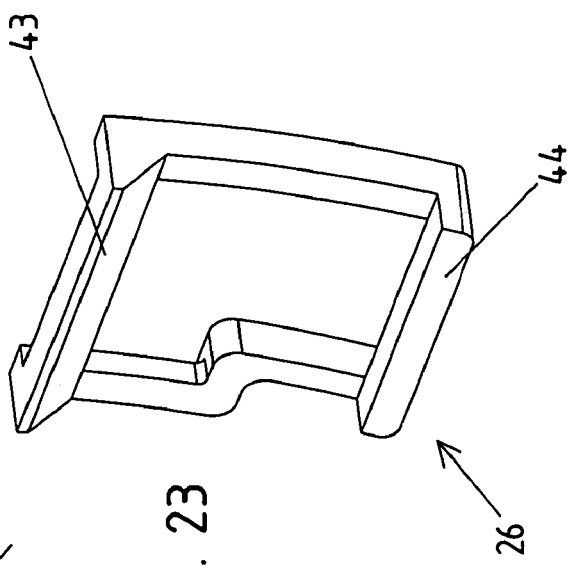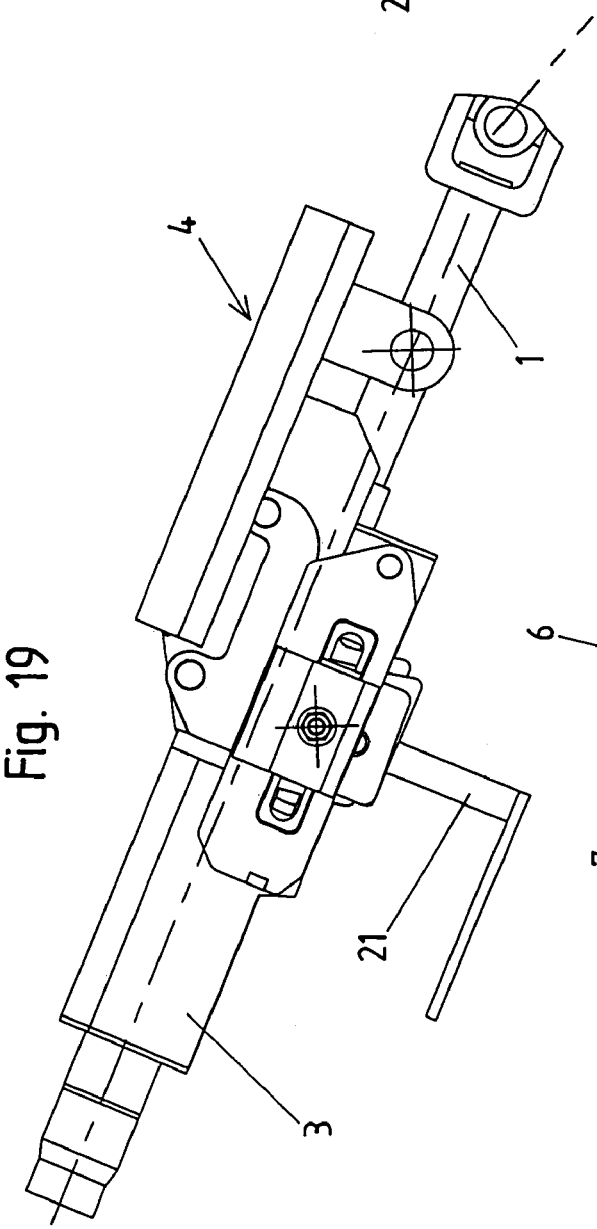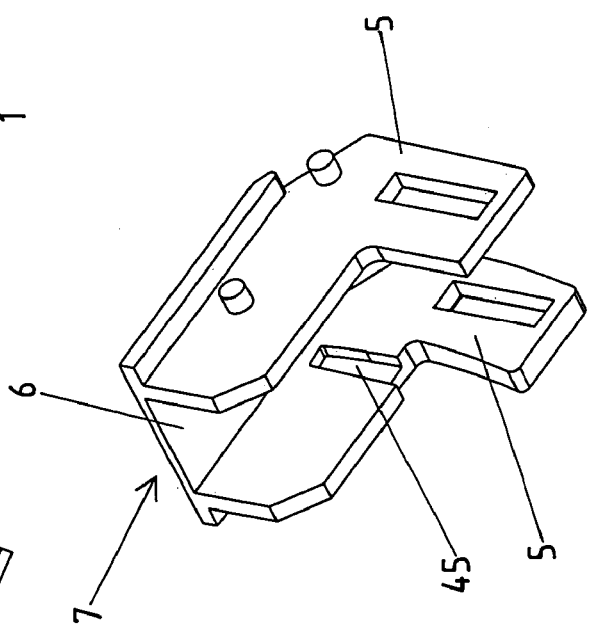

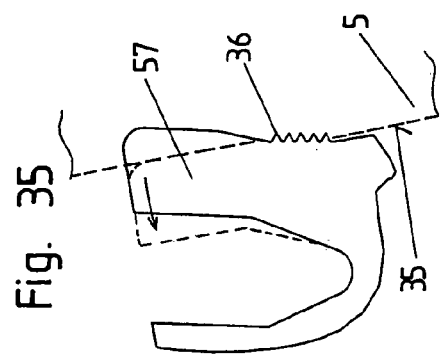
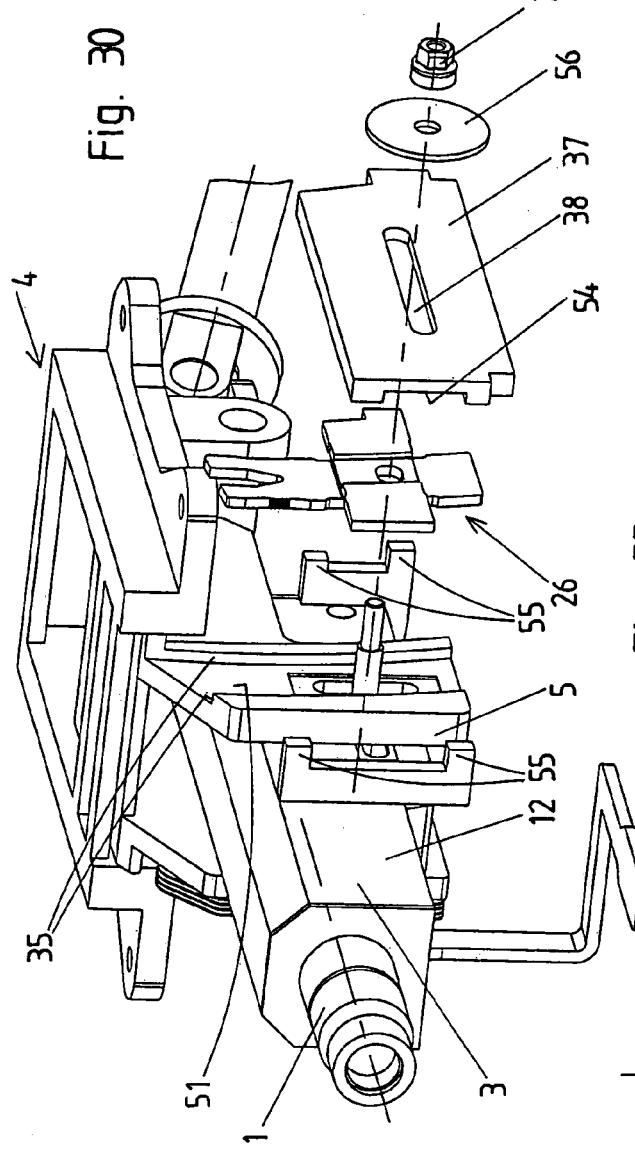
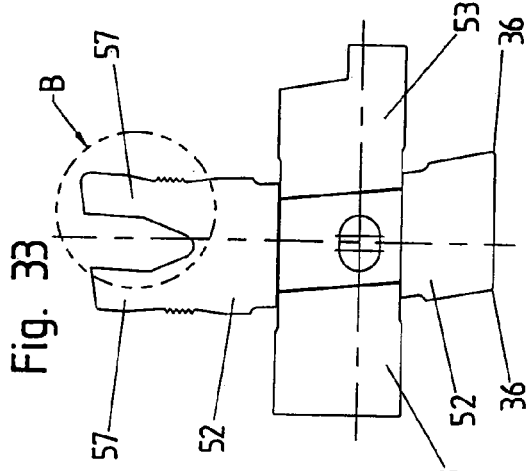
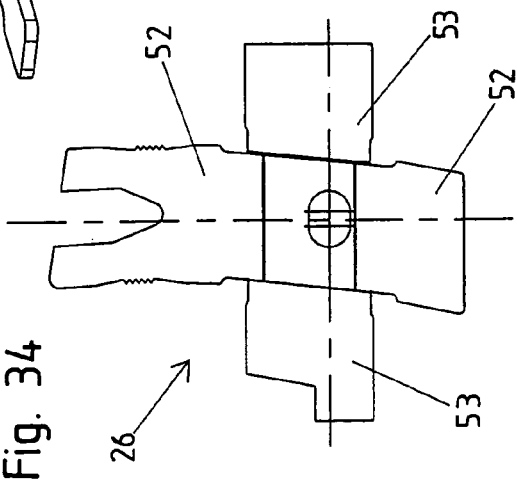

ADJUSTABLE STEERING COLUMN

FIELD OF THE INVENTION

The invention relates to an adjustable steering column with a steering spindle, a shell unit bearing the steering spindle, a console unit stationary on the chassis with at least one side wall extending laterally along the shell unit and supporting the shell unit, and a securement device which can be opened and closed. In the closed state of the securement device, the shell unit is connected with the console unit such that it is unadjustable through securing elements engaging one another, and in the opened state the shell unit is adjustable relative to the console unit in at least one direction of adjustment and which encompasses a tension bolt penetrating openings in the shell unit and in the at least one side wall.

DESCRIPTION OF RELATED ART

Adjustable steering columns are known in differing implementations. Although designs have also become known in which the steering column is only adjustable in one direction, currently widely used steering columns are adjustable in length, thus in the axial direction, as well as also in height. When adjusting the height, conventionally a pivoting takes place of the steering column about a horizontal axis perpendicular to the axial direction of the steering column, such that the height adjustment also entails a greater or lesser inclination adjustment.

In order to secure the steering column in the adjusted position, securement devices of differing models are known, which conventionally include a tension bolt and a tensioning device acting onto the tension bolt and actuatable by a tension lever. In the closed state of the securement device the securing elements are brought into engagement with one another, which secure in place the shell unit bearing the steering spindle relative to the chassis-stationary console unit under friction closure and/or form-fit closure.

In the closed state of the securement device the shell unit must be held unadjustably, on the one hand, against the forces acting it during normal operation, in particular the forces exerted by the driver the steering wheel, and on the other hand, the shell unit should also not become displaced relative to the console unit in the event of a crash, in order to offer the driver maximum safety. For example, the steering wheel must also remain in the set position to ensure the function of the airbag in case of a crash. For adjustable steering columns, therefore, standardized tests are carried out in order to test the holding forces exerted in the closed state of the securement device. Herein very high requirements exist especially in the direction of the height adjustment. To test the holding forces in the direction of height adjustment or length adjustment, forces acting in the particular direction are applied on the front end of the steering spindle, on which the steering wheel is to be attached.

To attain high holding forces, structures are known which have a relatively large number of friction faces engaging one another in the closed state, and plates are provided which can be brought into engagement in the manner of a multi-plate coupling. Such steering columns are disclosed for example in EP 0 802 104 B1, GB 2 092 967 A, WO 97/16337 A1, EP 1 170 194 A1 and U.S. Pat. No. 4,554,843 A. But the holding forces obtainable in the closed state of the securement device cannot readily be increased arbitrarily in such friction-closure securement devices. Due to a greater number of plates, the structure becomes more elaborate and consequently more expensive, the space requirement of the structure is increased and the requisite force to adjust the steering column in the opened state of the securement device is increased. The force applied by the tensioning device can also not be increased arbitrarily in view of the forces to be absorbed by the structure and the force required for closing the tensioning device by means of the tension lever.

In other known adjustable steering columns, engagement elements acting under form-fit closure are employed. Such steering columns, in which in the closed state of the securement device toothings come to engage one another, are disclosed for example in U.S. Pat. No. 5,988,679 A and DE 195 42 472 C1. But such toothings include the disadvantage that a stepless adjustment of the steering column is not possible and that, in the event of closing the tension lever in an adjustment position in which the tips of the teeth of the tooth bars opposing one another are directly oriented toward one another, blocking of the tension lever can occur, such that the setting of the steering column must first be changed slightly and only then can the tension lever be closed. In addition, the holding forces producible by securing elements acting with form-fit closure are also not arbitrarily high.

In the case of a force acting at least also in the direction perpendicular to the longitudinal axis of the steering column onto the front end of the steering spindle, as can occur in the event of a crash, with a corresponding layout of the engagement elements of the securement device the deformation of the steering column occurs, before, after overcoming the holding forces of the engagement elements, a displacement of the shell unit relative to the console unit occurs in the direction of height adjustment and optionally also in the direction of length adjustment. In this deformation the shell unit is torqued in the proximity of the side wall relative to it about an axis of rotation parallel to the tensioning bolt and in the proximity of the securement device. This "virtual" axis of rotation also changes its position in the proximity of the securing element over the course of the advancing deformation of the steering column. During this torsion of the shell unit relative to the side wall existing tolerances of the securing elements are consumed first and in the following a mutual slipping of the securing elements occurs in the sense of a rotational movement. Only with a further increase of the force is the holding force finally overcome of the holding elements to be produced against a displacement in the direction of the height adjustment and/or in the direction of the length adjustment and the steering column is displaced in the direction of the height adjustment and/or in the direction of the length adjustment until the end of the adjustment range. The deformation of the steering column through the force acting on the front end of the steering spindle with the closed securement device at least also in the direction of the height adjustment is produced initially thereby that parts having mutual tolerance, for example two subpieces of the steering spindle which can be telescoped with respect to one another, go into arrest, and, as a consequence, material deformations occur, for example through bending of weaker parts of the steering spindle.

SUMMARY OF THE INVENTION

One important task of the invention is providing an adjustable steering column of the above described type, in which at a force acting on the steering column in the closed state of the steering column, which under deformation of the steering column leads to a torsion at least of the segment in the proximity of the at least one side wall of the shell unit relative to this side wall about a rotational axis parallel to the tension bolt and in the proximity of the securement device, an especially high holding force at least in one adjustment direction, preferably at least in the direction of height adjustment, relative to an adjustment of the steering column is applied. According to the invention this is achieved through an adjustable steering column comprising:

a steering spindle, a shell unit bearing the steering spindle, a console unit stationary on the chassis with at least one side wall, which extends laterally along the shell unit and supports the shell unit, a securement device which can be opened and closed, in the closed state of which the shell unit is unadjustably connected with the console unit through securing elements engaging one another, and in the opened state of which the shell unit is adjustable relative to the console unit at least in one adjustment direction and which encompasses a tension bolt penetrating openings in the shell unit and in the at least one side wall, for at least one adjustment direction at least one tilting part acting in this adjustment direction, which is supported displaceably either relative to the side wall or the shell unit in this adjustment direction and which is nondisplaceably connected with the other of these two parts in this adjustment direction, wherein with a torsioning, entailed in a deformation of the steering column at least of the segment in the proximity of the side wall, of the shell unit relative to the side wall about an axis of rotation parallel to the tension bolt and in the proximity to the securement device an entrainment takes place of the tilting part by that part with which it is unadjustably connected in this adjustment direction, and clamping edges and clamping, on the one hand, of the tilting part and, on the other hand, of that part, relative to which the tilting part is displaceably supported in this adjustment direction, become engaged with one another, whereby the displaceability of the tilting part in this adjustment direction is inhibited.

Through the torsioning of the shell unit relative to the console unit due to the force action, as described above, wherein this tosioning can be within the range of a few degrees, a torque is exerted onto the tilting part about the virtual rotational axis in the proximity of the securement device, whereby a tilting or a biting of the clamping edges against the clamping faces (occurs). Thereby the displaceability of the tilting part in the adjustment direction is blocked resulting in a high holding force against an adjustment of the shell unit relative to the console unit in this adjustment direction. The tilting part comprising the clamping edges can herein favorably comprise at least in the proximity of the clamping edges a harder material than the clamping faces, whereby a form-fit clawing-in or digging-in of the clamping edges in the clamping faces is supported.

In an advantageous embodiment of the invention the steering column is developed such that it is length as well as also height adjustable and at least one tilting part is provided acting in the direction of the height adjustment. This can advantageously be supported displaceably relative to the side wall of the console unit in the direction of height adjustment and be fastened on the shell unit unadjustably in the direction of height adjustment, with the tilting part supported displaceably relative to the shell unit in the direction of the length adjustment to permit the length adjustment.

Further the console unit can advantageously include side walls extending bilaterally along the shell unit, between which the shell unit is guided, with the tension bolt penetrating both side walls through openings. Furthermore, the openings in the shell unit and in the at least one side wall penetrated by the tension bolt can favorably be developed as elongated holes which are oriented, for one, in the direction of length adjustment and, for another, in the direction of height adjustment. Instead of interdigitating elongated hole cutouts, window-like openings can be provided for example either in the shell unit or in the side walls to make possible a length adjustment as well as also a height adjustment.

BRIEF DESCRIPTION OF THE DRAWINGS

Additional advantages and details of the invention will be explained in the following in conjunction with the embodiment examples of the invention depicted in the drawings, based on which further tasks of the invention are evident. The drawings depict:

FIG. 5 is a perspective representation of parts of the securement device, partially pulled apart in the manner of an exploded drawing, FIG. 7 is a cross section along line AA of FIG. 3, FIGS. 8 and 9 are perspective representations of the tilting part from different viewing angles, FIG. 10 is a view of the inside of the tilting part, FIG. 11 is a second embodiment example of the invention in a side view, FIG. 14 is a cross section through the steering column in the proximity of the tension bolt (analogous to FIG. 7), FIG. 15 and FIG. 16 are three-dimensional representations of the tilting part viewed from different angles, FIG. 17 and FIG. 18 are views of the outside and the inside of the tilting part, FIG. 19 is a side view of a steering column according to a third embodiment example of the invention, FIGS. 22 and 23 are perspective representations of the tilting part from different viewing angles, FIG. 24 is the support part of the console unit in a perspective representation, FIG. 30 is a perspective representation of a fifth embodiment example of a steering column according to the invention, with parts of the securement device pulled apart in the manner of an exploded representation, FIG. 33 and FIG. 34 are views of the tilting part from the outside and from the inside, FIG. 35 is an enlarged detail B from FIG. 33, FIG. 36 and FIG. 37 are views from the outside and from the inside of a modified tilting part applicable in connection with the fifth embodiment example.

The Figures are drawn to different scales. Equifunctional or at least analogous parts in the individual Figures are denoted by identical reference symbols.

DETAILED DESCRIPTION OF PREFERRED EMBODIMENTS

Figure 1:
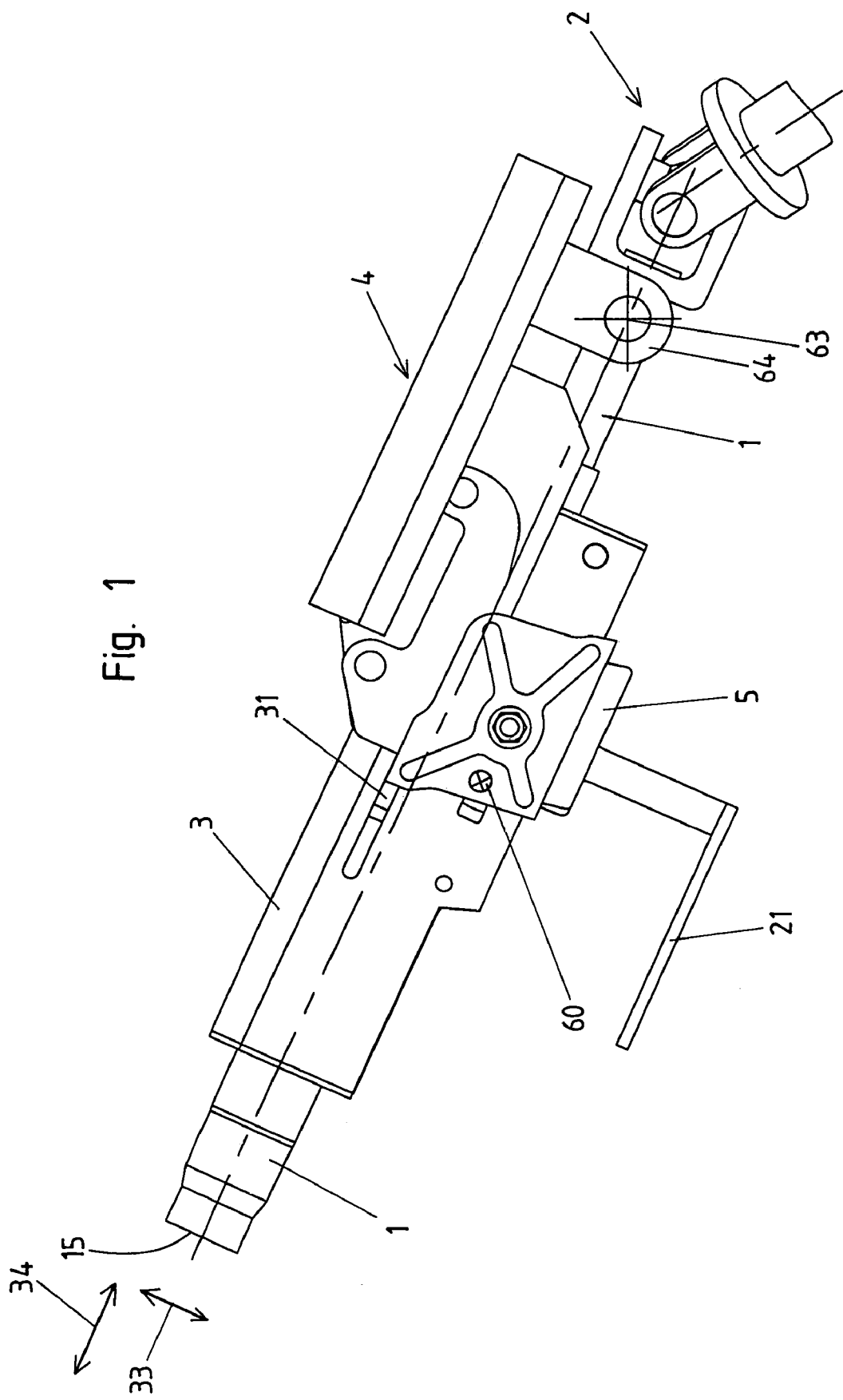
FIG. 1 and FIG. 2 are side views of a first embodiment example of a steering column according to the invention.
Figure 2:
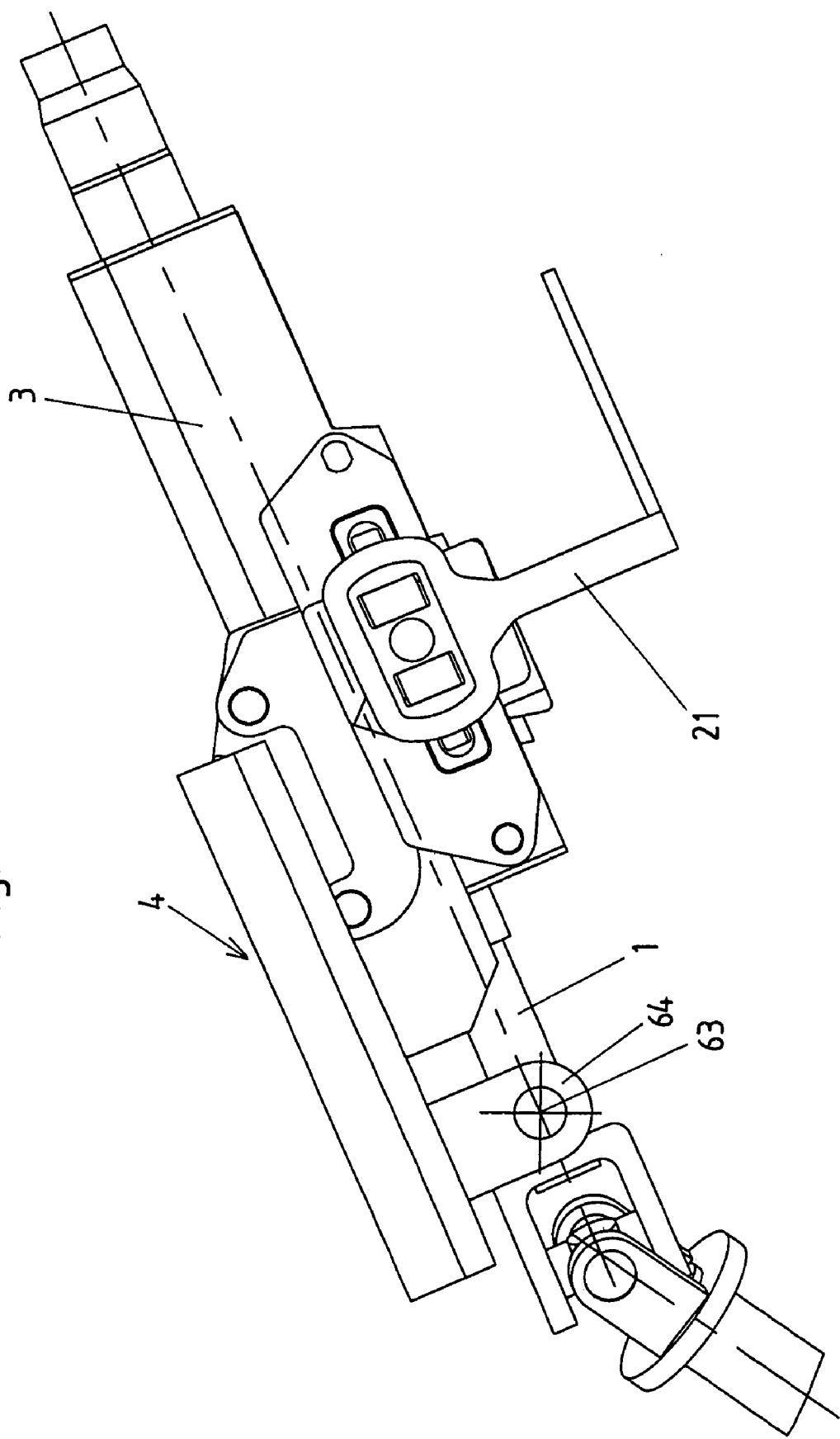
Figure 3:
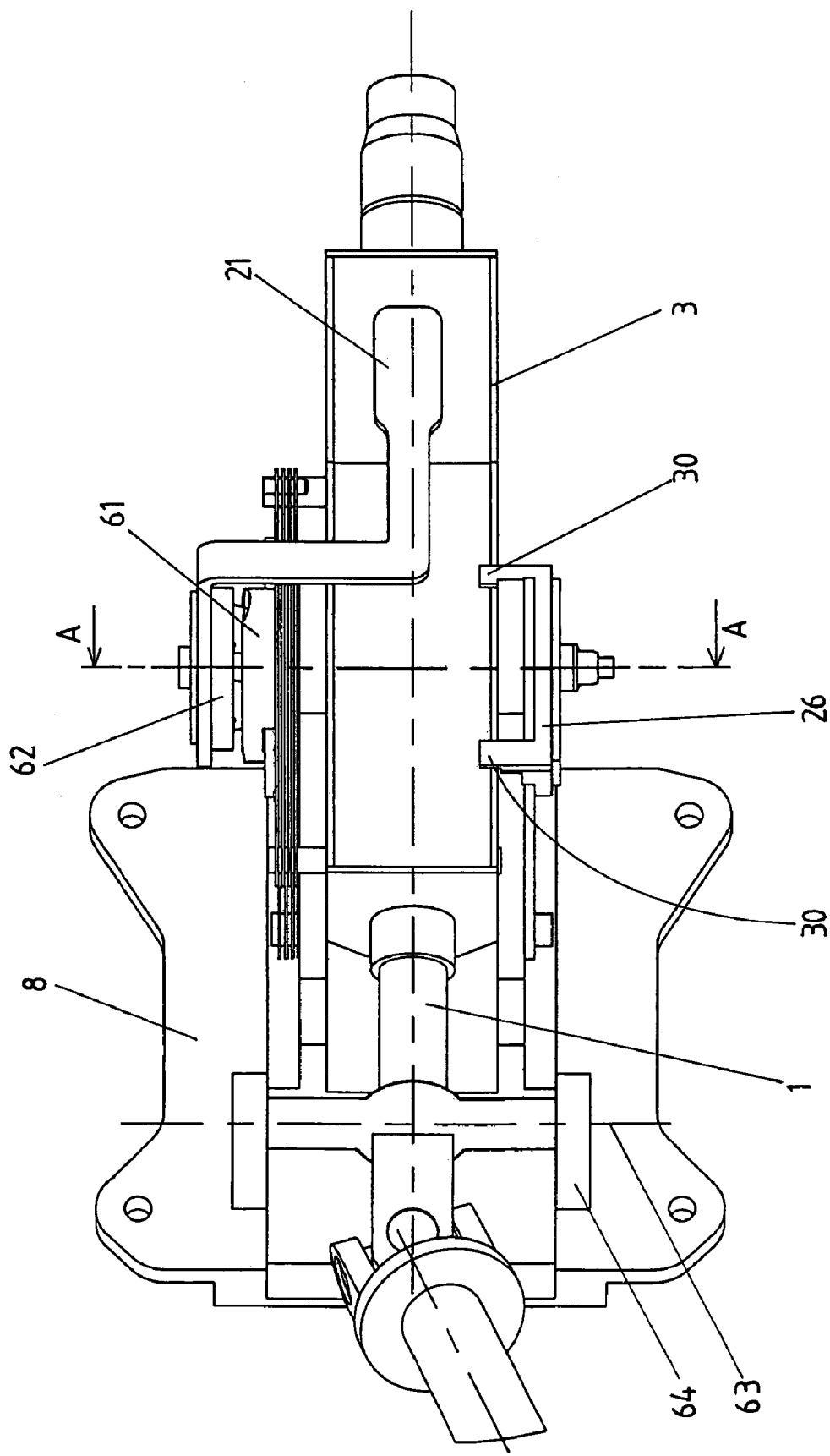
FIG. 3 is a view from below.

The positioning terms "inside" and "outside" are to be understood in this application that parts lying further inwardly are disposed further in the direction toward the central longitudinal axis of the steering spindle than parts lying further outside. The terms "front" and "rear" are to be understood such that a part lying further frontwardly is disposed further in the direction to the end of the steering spindle on which the steering wheel is to be attached.

A first embodiment example of a steering column according to the invention is depicted in FIGS. 1 to 10. The steering column comprises a steering shaft or steering spindle 1, of which in the Figure only a front segment is shown adjoining the steering wheel, not shown in the Figures, up to a first universal joint 2. The steering spindle 1 is rotatably supported in a, for example, tubular or box-shaped shell unit 3, which encompasses a segment of the steering spindle. The shell unit 3 is supported by a console unit 4. For this purpose the console unit 4 includes two side walls 5 extending laterally along the shell unit 3, whereby the console unit, viewed in cross section (FIG. 7), is approximately U-shaped. The side walls 5, together with a support plate 6 connecting these side walls, form a support part 7 of the console unit 4, which is held in a mounting part 8 provided for mounting on the chassis or in a part of the motor vehicle stationary on the chassis. The support part 7 and the mounting part 8 may be rigidly connected. But the support part 7 can also be clamped in the mounting part 8 in a defined manner, and in the event of a crash a displacement of the support part 7 is possible in the axial direction of the steering spindle relative to the mounting part 8. Such a connection of the support part 7 with the mounting part 8 has already become known in conventional steering columns and is not subject matter of the present invention. A development of the console unit or of a support part 7 of the console unit 4 with only an isolated steering column extending on one side of the shell unit next to it is also conceivable and possible.

To make a length adjustment of the steering column possible, i.e. in the axial direction of the steering spindle 1, and in height or inclination, intersecting elongated holes 9, 10 are provided in the shell unit 3 and in the side walls 5 of the console unit 4, which are penetrated by a tension bolt 11 continuous in the embodiment examples shown. For the length adjustment of the steering spindle, it comprises in addition in known manner two telescope-like segments displaceable in the axial direction against one another. The elongated holes 9 in the opposing side faces 12 of the shell unit 3 are aligned parallel to the longitudinal axis 13 of the steering spindle 1 and consequently serve for length adjustment. The elongated holes 10 in the side walls 5 intersect the elongated holes 9 approximately at right angles and serve for height or inclination adjustment. During this height adjustment a pivoting occurs of the steering spindle and of the shell unit about an axis 63 parallel to the longitudinal axis 14 of the tension bolt 11 and formed in the proximity of the universal joint 2, such that simultaneously with the height adjustment of the steering spindle in the proximity of its front end 15, on which a steering wheel is attached, an inclination adjustment of the longitudinal axis 13 of the steering spindle takes place. The axle 63 can be formed for example thereby that a rotatable part is provided rotatably receiving the steering spindle 1 and encompassing it annularly, which includes bolts projecting bilaterally which are rotatably received in link plates 64 of the console part 4.

In the embodiment example shown, two stacks of inserting and sandwich-like interdigitating plates 17, 18 are provided on the outside of the one side wall 5. The plates 17 have elongated holes 19, which are disposed substantially congruently with the elongated holes 10 in the side walls 5, and the plates 18 have elongated holes 20, which are disposed substantially congruently with respect to the elongated holes 9 in the shell unit 3. The plates 17 are fastened on the outside of the side walls 5, the plates 18 on the outside of the shell unit 3, for which purpose in each instance appropriate supporting bolts are provided.

The plates 17, 18 and the tension bolt 11 form parts of a securement device for fastening the shell unit 3 relative to the side walls 5 in a set position. This securement device further comprises a counterpressure plate 61 penetrated by the tension bolt, and a tension plate 62 also penetrated by the tension bolt, and on which a tension lever 21 is attached, through which the tension plate 62 can be rotated about the longitudinal axis 14 of the tension bolt 11. The head 22 of the tension bolt is in contact with the outside of the tension plate 62. On the side of the tension plate 62 facing the counterpressure plate 61, the tension plate 62 comprises projecting rollers 23, which, in the opened state of the securement device, lie in depressions 24 of the counterpressure plate 61. With a torsion of the tension plate 62 the rollers 23 come to lie in areas of the counterpressure plate 61 without such depressions, whereby the counterpressure plate 61 and the tension plate 62 come to be spaced further apart. The counterpressure plate 61 is thereby pressed against the plates 17, 18, whereby these are tensioned against one another. Instead of the shown counterpressure plate 61 and tension plate 62, tension units developed differently and actuatable by a tension lever 21 can also be provided, which comprise, for example, threaded surfaces in contact with one another.

On the opposing side of tension bolt 11 a tension nut 25 is screwed onto its end, which nut is in contact on the outside of a tilting part 26. When closing the securement device, apart from the friction faces formed by the plates 17, 18, additional faces are placed against one another under frictional closure, whereby the holding force against an adjustment of the steering column in the closed state of the tension device is increased. These are the side faces 12 opposing one another of the shell unit 3 and inner faces of the side walls 5 as well as the outer faces opposing one another of side wall 5 on the right-hand side in FIG. 7, which is formed by the reinforcement plate 27 disposed on side wall 5 and the inner face of the tilting part 26. All cooperating friction faces form securing elements of the securement device.

With the exception of the tilting part 26, which will be explained in further detail in the following, the securement device shown in the embodiment examples of the invention with the described cooperating friction faces, corresponds in principle in terms of their structure and function to the securement device disclosed in EP 0 802 104 B1. Other securement devices could also be provided within the scope of the invention, for example such with securing elements acting with form-fit closure or such, in which the tension bolt is not continuous, or such, in which an additional guidance part is provided, disposed in particular between the shell unit and the console unit, with the guidance part being adjustable relative to the console unit in a first adjustment direction and the shell unit relative to the guidance part in a second adjustment direction.

The tilting part 26 comprises on its inside tilting ledges 28, 29 overlapping on both sides of the side wall, on which are disposed nose-like engagement elements 30 projecting inwardly. The upper one of these engagement elements 30 projects into a guidance slot 31 disposed in the side face 12 of the shell unit, which slot is aligned parallel to the elongated hole 9. The lower engagement elements 30 overlap the lower longitudinal edge 32 of shell unit 3.

Figure 4:
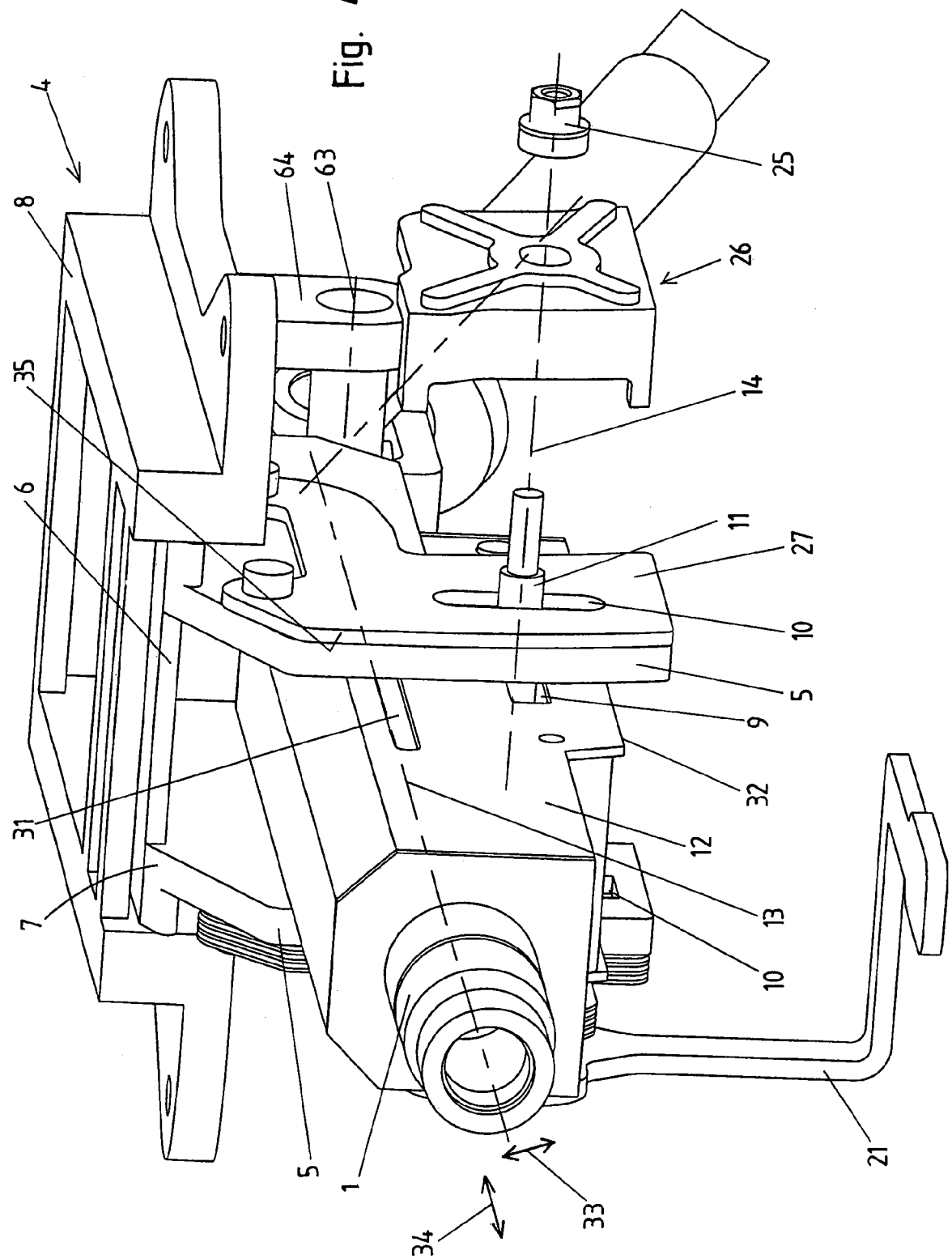
FIG. 4 is a perspective representation of the steering column, wherein the tilting part and the tension nut to be screwed onto the tension bolt are pulled apart in the manner of an exploded drawing.
Figure 6:
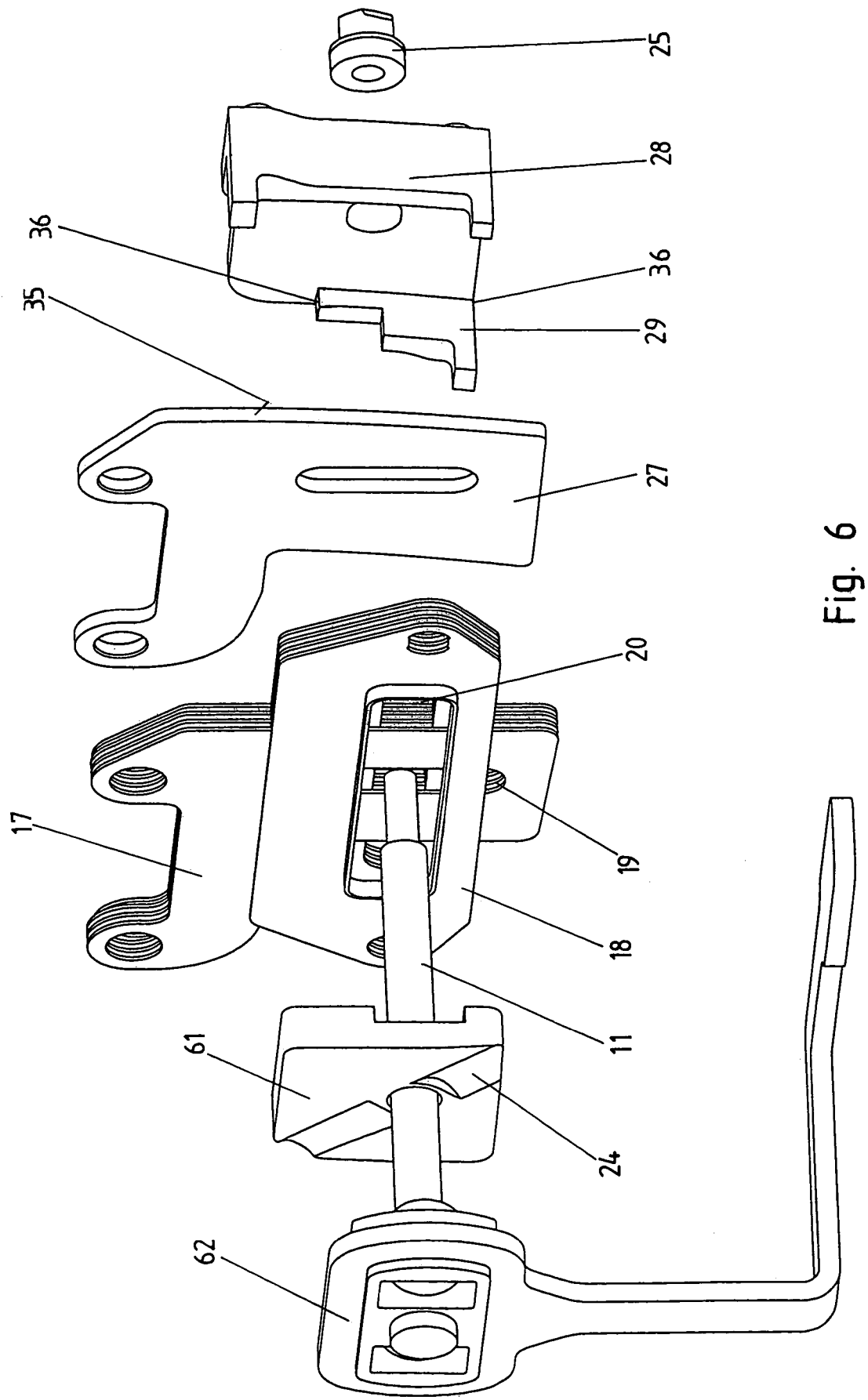
FIG. 6 is a perspective representation corresponding to FIG. 5, but viewed from different angles.
Figure 12:
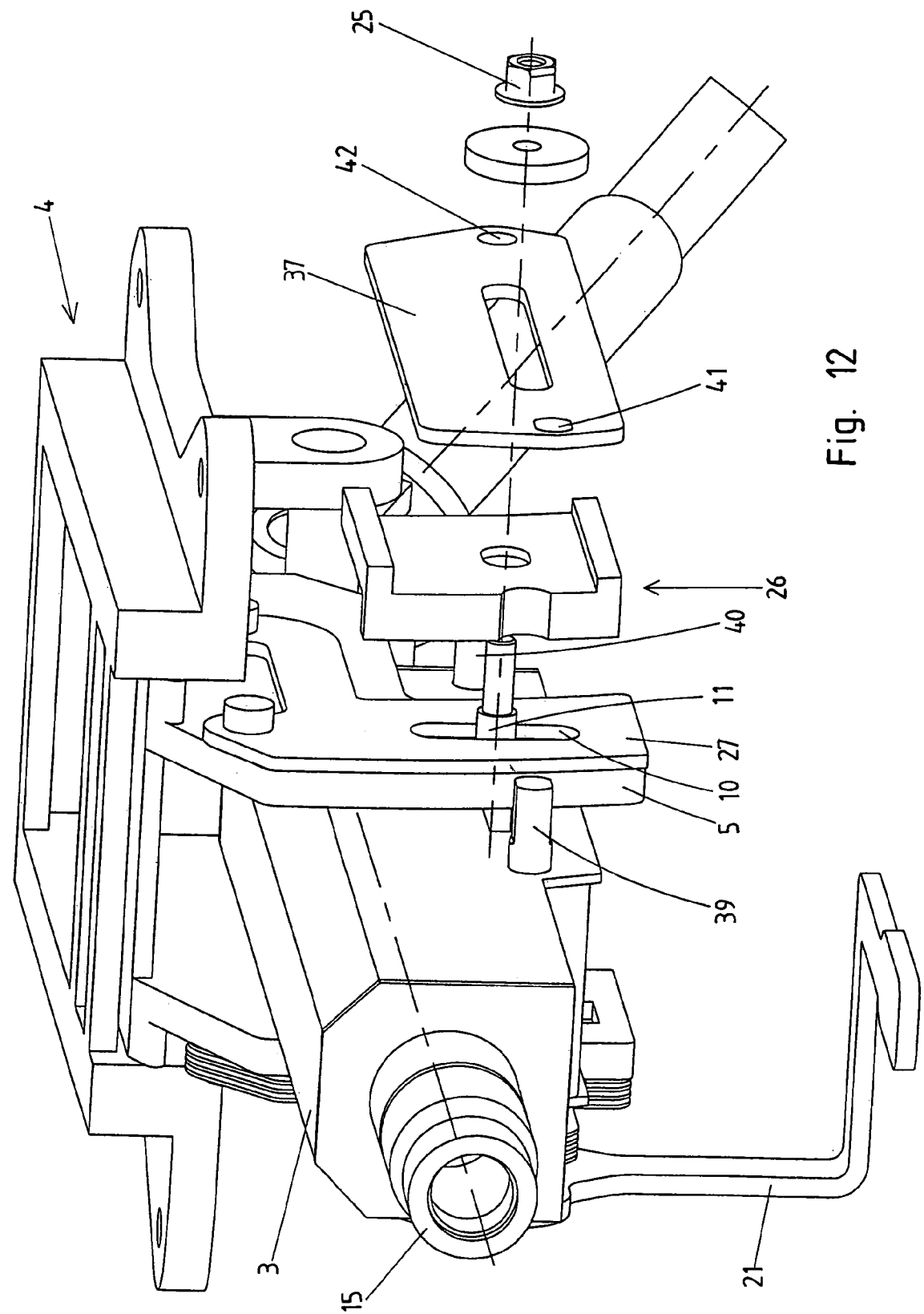
FIG. 12 is a perspective representation of the second embodiment example of the invention, with parts of the securement device pulled apart in the manner of an exploded representation.
Figure 13:
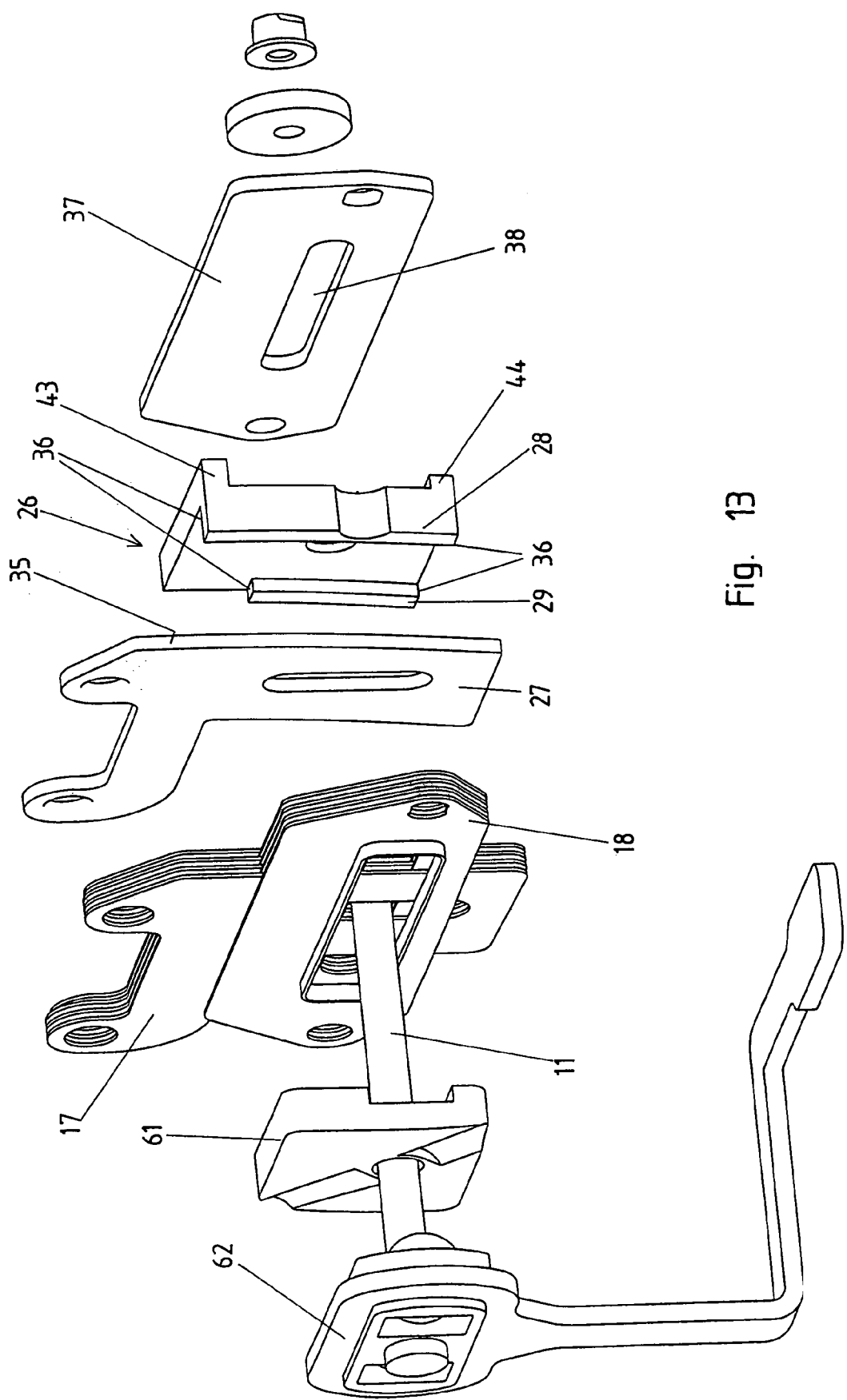
FIG. 13 is a perspective representation of parts of the securement device, partially pulled apart as an exploded view, viewed from an angle different from FIG. 12.
Figure 20:
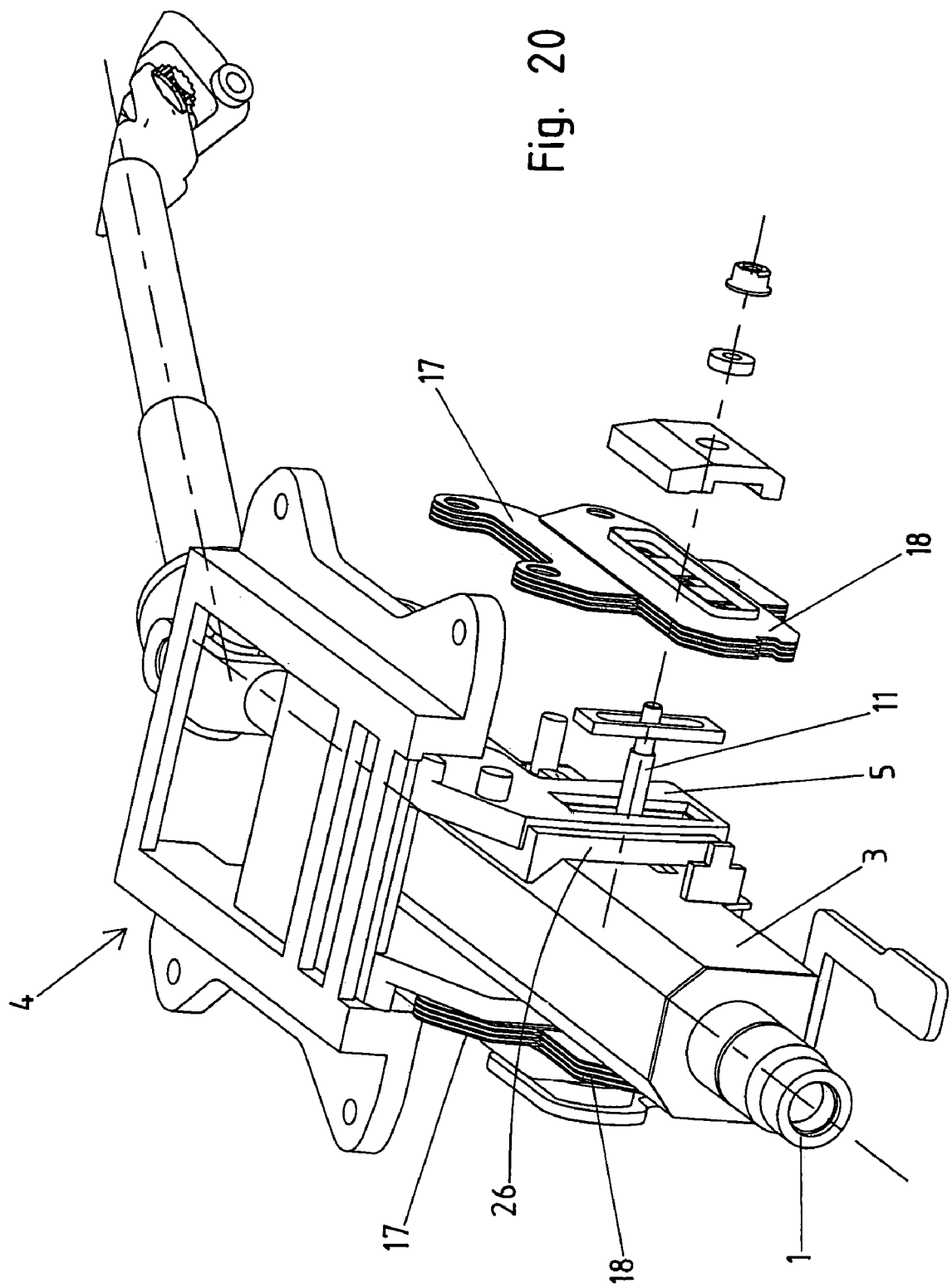
FIG. 20 is a perspective representation of the steering column, with parts of the securement device pulled apart in the manner of an exploded representation.
Figure 21:
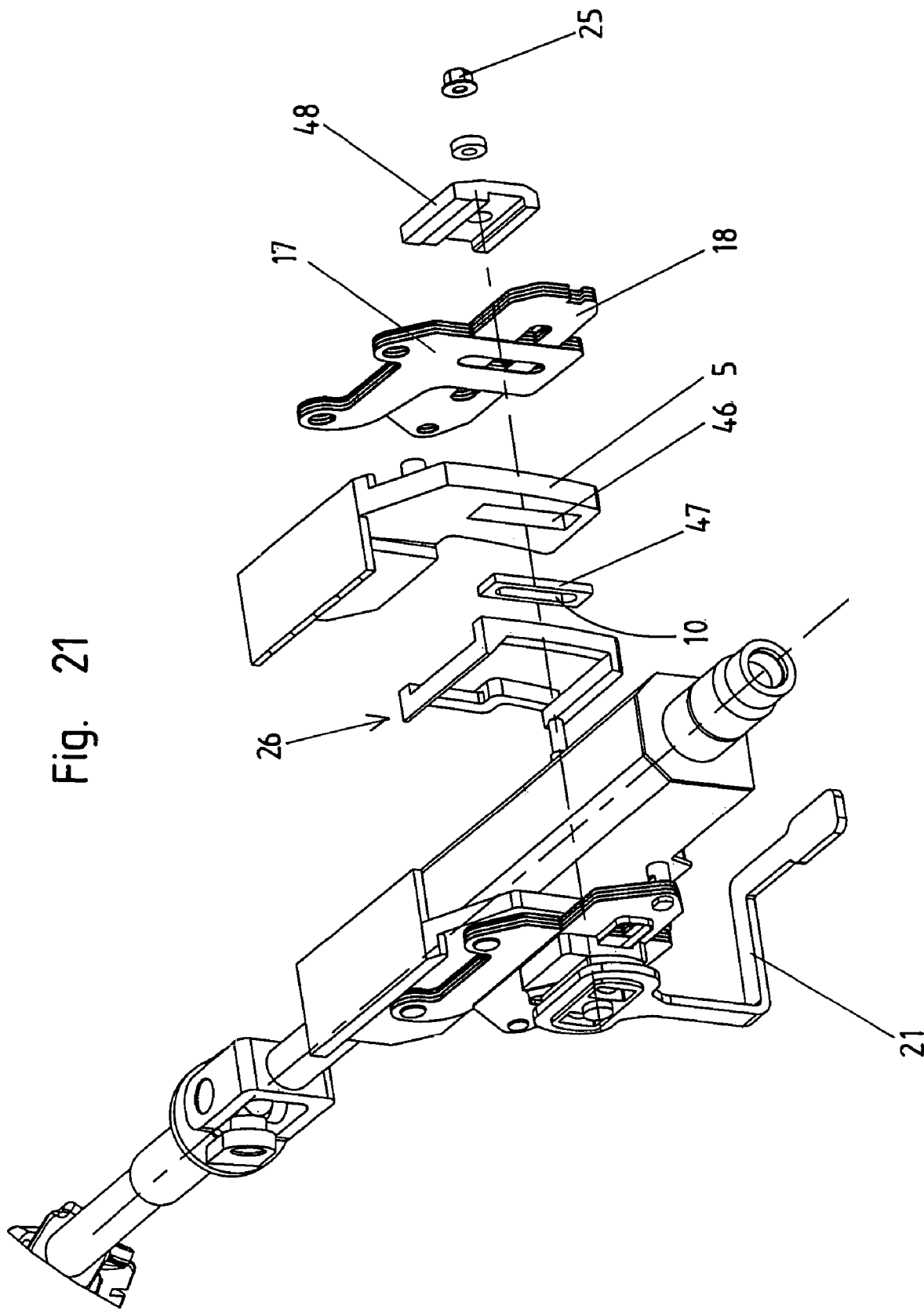
FIG. 21 is a perspective representation from another viewing angle again with parts of the securement device pulled apart, the mounting part of the console unit removed and the support part of the console unit sectioned centrally and pulled apart.
Figure 25:
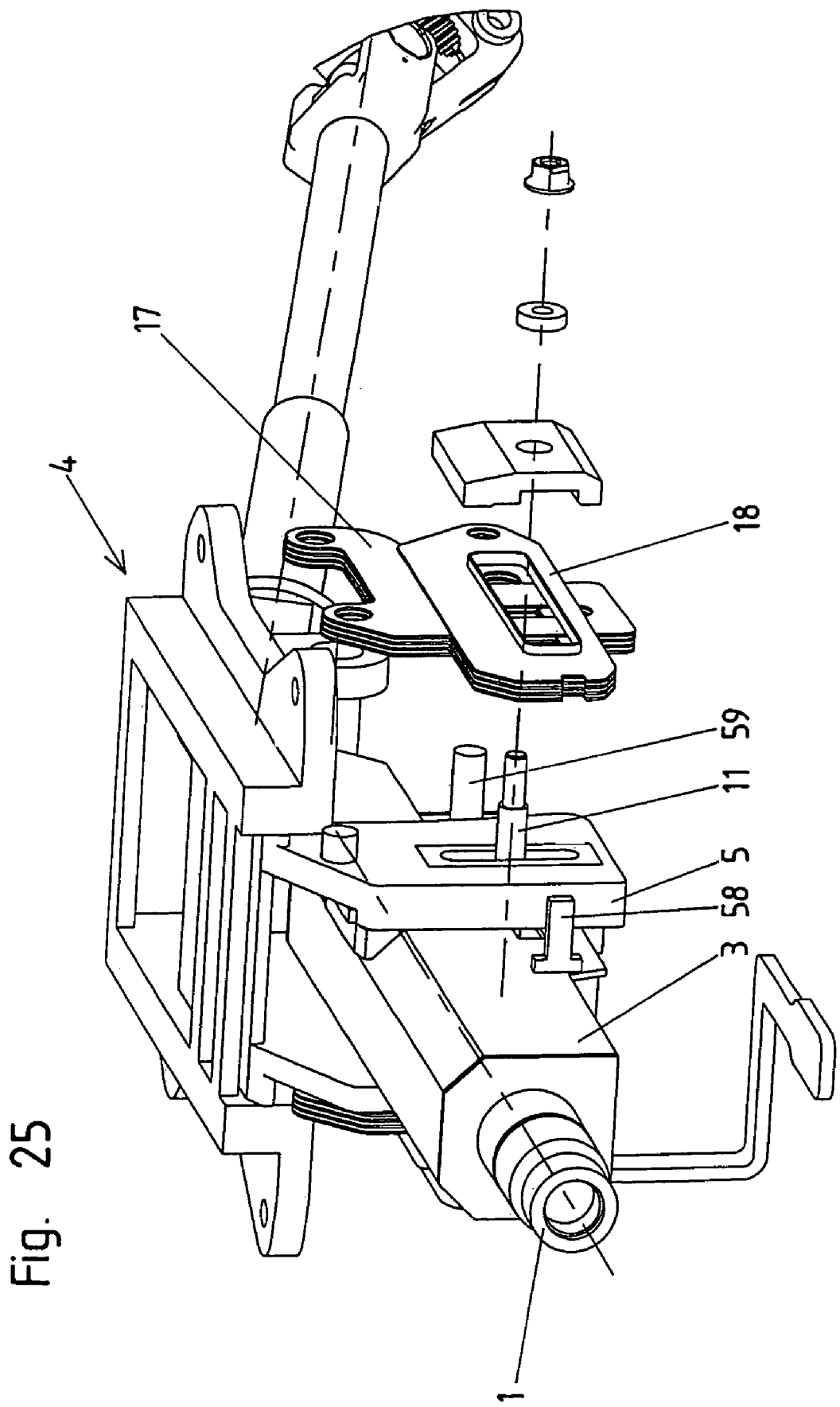
FIG. 25 shows a steering column according to a fourth embodiment example of the invention with parts of the securement device pulled apart in the manner of an exploded representation.
Figure 26:
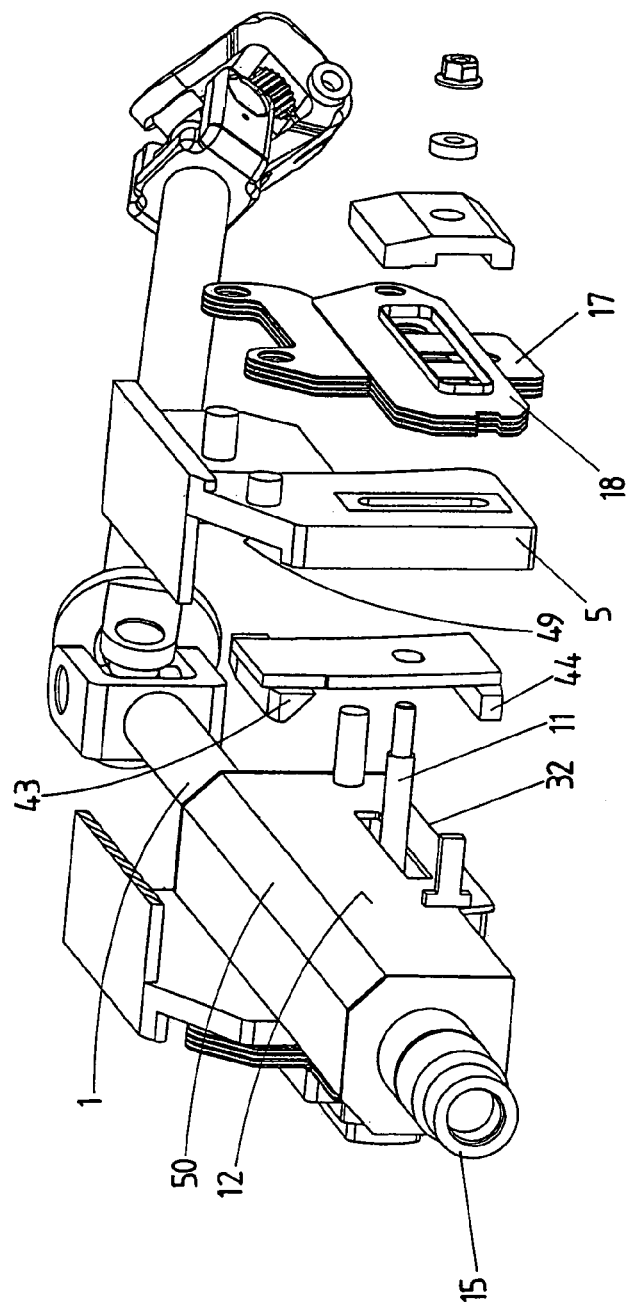
FIG. 26 is a perspective representation with a viewing angle corresponding to FIG. 25, with the mounting part of the console unit removed and the support part of the console device sectioned centrally and pulled apart.
Figure 29:
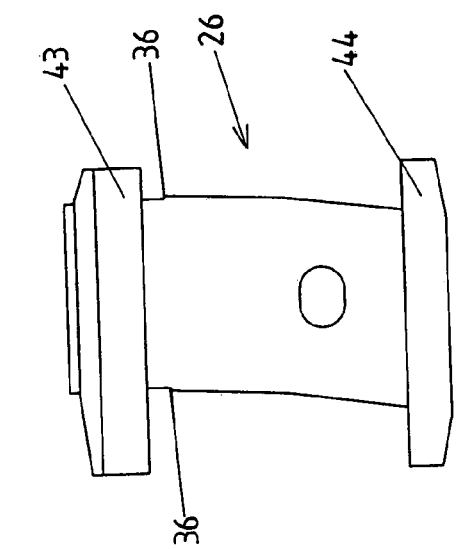
FIG. 28 and FIG. 29 are views of the tilting part from the outside and from the inside.
Figure 28:
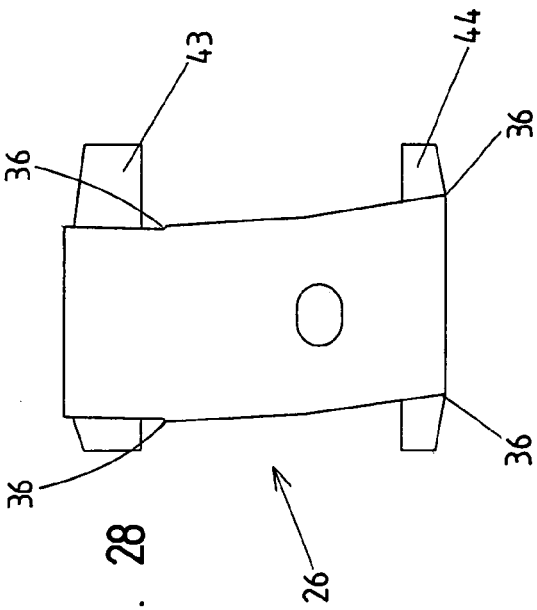
Figure 27:
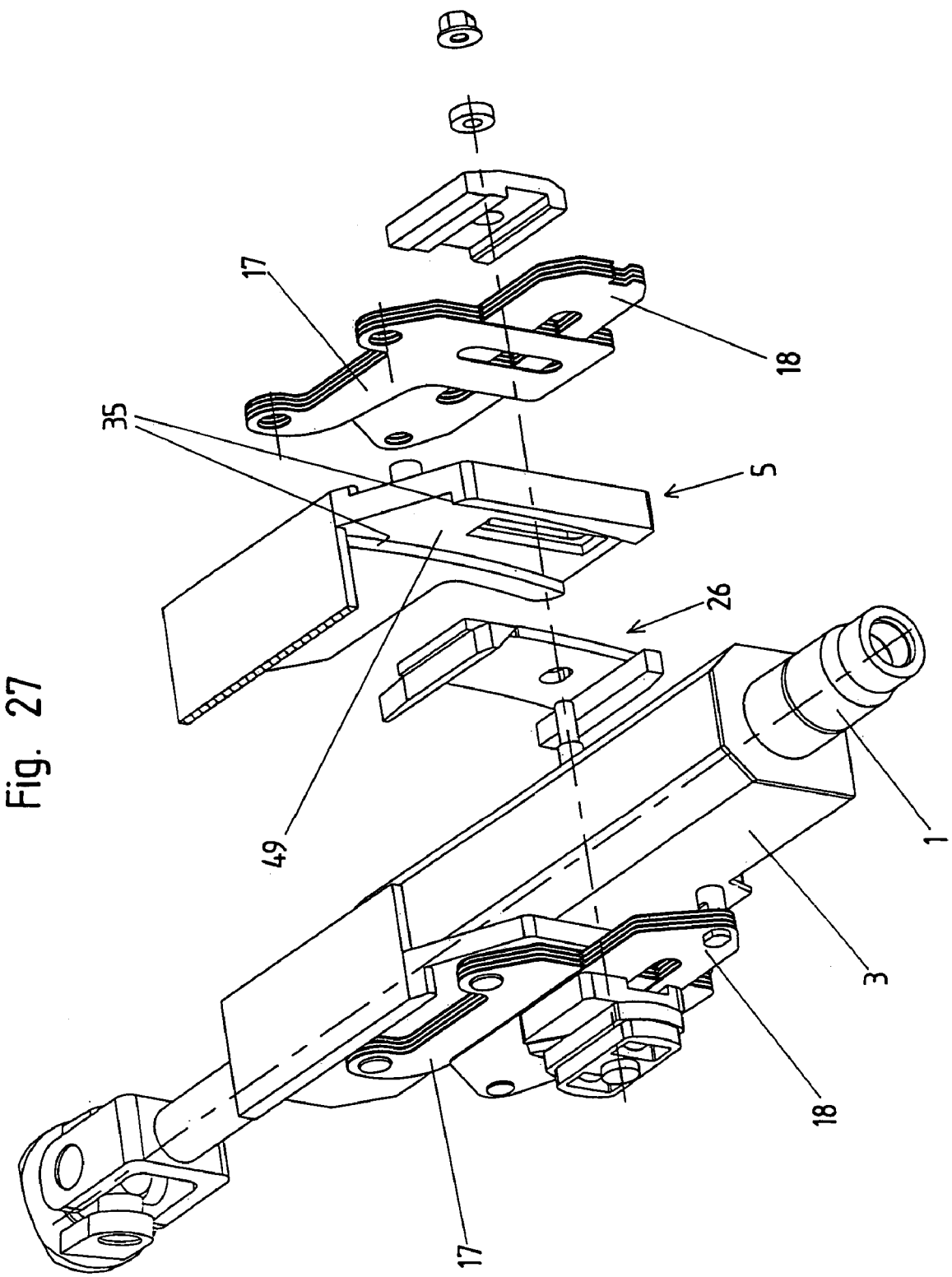
FIG. 27 is a perspective representation corresponding to FIG. 26, but from a different viewing angle.
Figure 31:
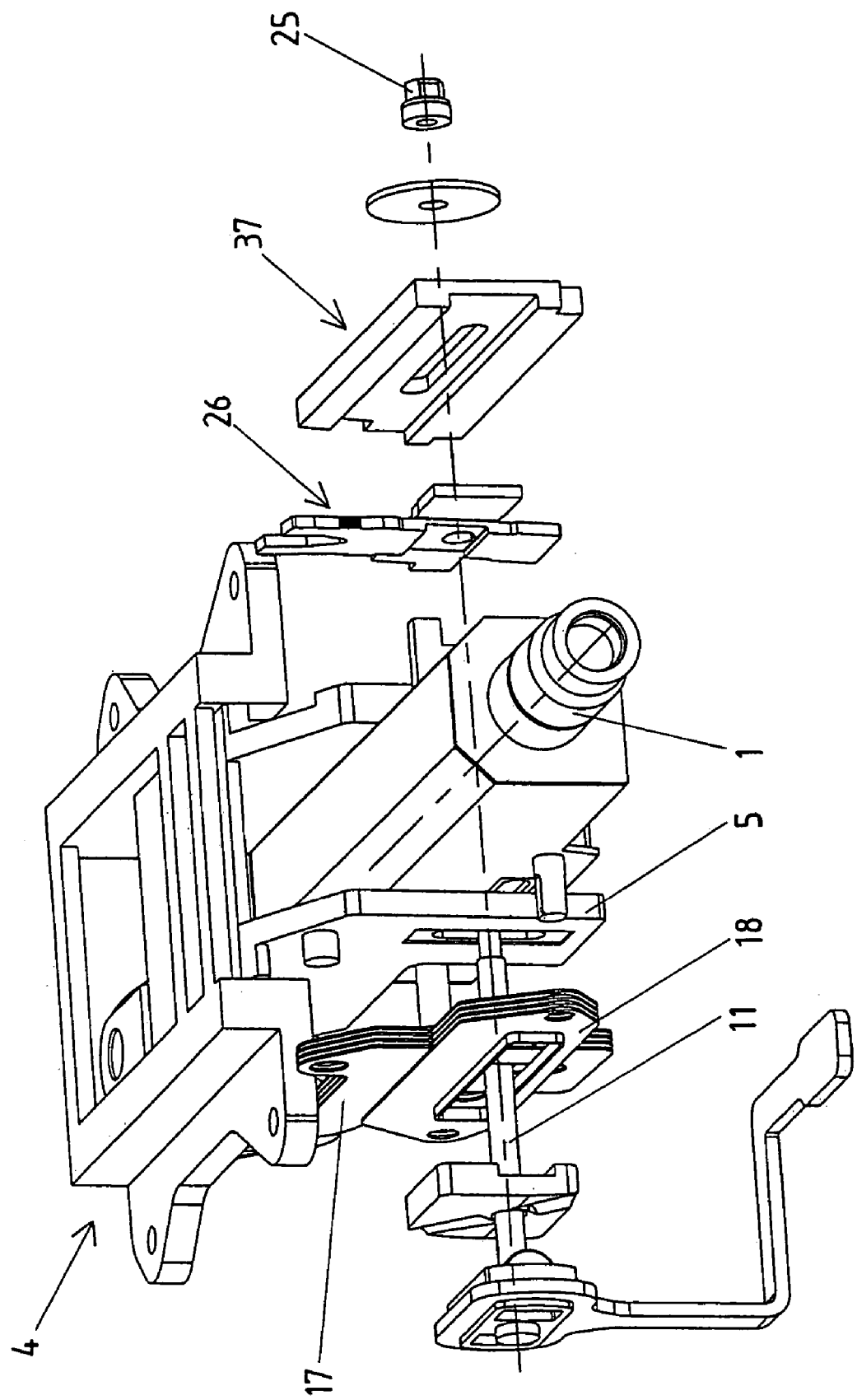
FIG. 31 is a perspective representation from a viewing angle differing from FIG. 30, again, partially in the manner of an exploded representation, FIG. 32 a [noun missing: section?] in the overlap region between the tilting part and the transmission part.
Figure 32:
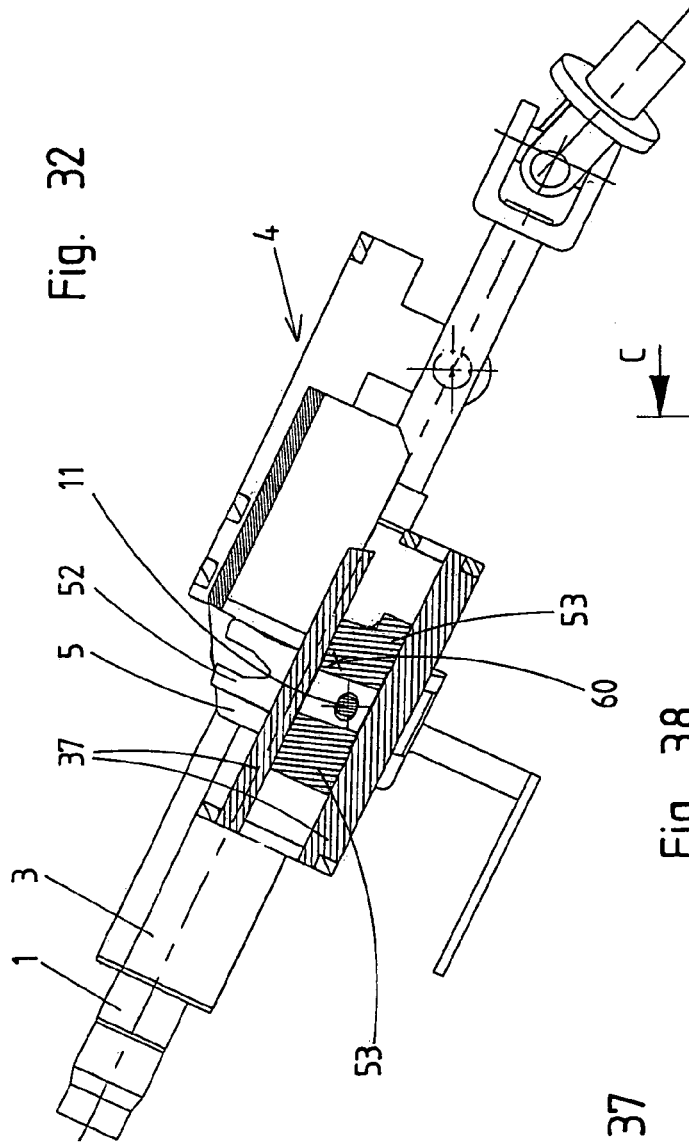

This tilting part 26 acting in the direction of height adjustment is thus fastened on shell unit 3 through the engagement elements 30 (a means for supporting the tilting part 26) and is displaceable in the direction of the height adjustment, which is indicated in FIG. 4 by the double arrow 33. In the direction of length adjustment (double arrow 34 in FIG. 4) the tilting part 26, in contrast, is supported displaceably relative to the shell unit 3. In the direction of height adjustment 33 the tilting part 26 is additionally supported displaceably relative to side wall 5, with the side wall 5 extending in the guidance path of the tilting part 26 delimited by the two tilting ledges 28, 29. The tilting part 26 is penetrated by tension bolt 11 through an opening in the tilting part 26.

With the securement device closed the tilting part 26 contributes only minimally (via its inside face in contact on the side wall 5) to the holding forces produced by it in normal operation (without torsion of the shell unit due to action forces). In a test simulating a crash for determining the maximum holding force of the securement device in the direction of height adjustment, a force is exerted on the steering spindle in the proximity of its front end 15 acting in the direction of height adjustment (double arrow 33). This force is initially absorbed by the securing elements of the securement device, and these securing elements can be formed, for example, by adjoining friction faces, in contact with one another, of plates or other parts. Before the holding forces of the securing elements are overcome in the sense of a displacement of the shell unit in the direction of height adjustment, the securing elements, formed in the depicted embodiment example by plates, can slide with respect to one another in the sense of a torsion. Thereby a certain torsion of the shell unit 3 relative to the side walls 5 in the proximity of the securement device becomes possible with the steering spindle becoming deformed with respect to the axial orientation. In this deformation, tolerances between parts are utilized first and subsequently material deformations occur, especially bending of parts of the steering spindle. This torsion of shell unit 3 relative to side wall 5 takes place about a virtual axis of rotation 60 aligned parallel to the tension bolt and located in the proximity of the securement device, which is shown by example in FIG. 1. The position of this virtual axis of rotation can change in the course of increasing the force acting on the front end of the steering column and can shift, for example, closer in the direction toward the tension bolt 11 or onto another side of the same. Due to the holding forces exerted by the securing elements, this axis of rotation 60 is located in the proximity of the securement device, i.e. it penetrates the steering column in a region which the securing elements of the securement device overlap. The torsion of the shell unit 3 relative to side walls 5 already takes place at a force attacking at the front end of the steering spindle which is less than the force required for a displacement of the shell unit 3 in the adjustment range relative to the side walls 5, which would be comparatively greater.

According to the invention a tilting part 26 is provided, which becomes effective with a torsion of the shell unit 3 relative to side walls 5 about the axis of rotation 60, in that the clamping edges 36 come to engage the clamping faces 35. Thereby an additional holding force is exerted. The requisite force acting on the front end of the steering column in the direction of height adjustment, to effect a displacement of the shell unit 3 relative to the console unit 4 in the direction of height adjustment, is thereby significantly increased.

In the torsion of the shell unit 3 relative to the console unit 4 the tilting part 26 is entrained by the shell unit via the engagement elements 30 (the means for supporting the tilting part 26 also being a means for transmitting torque) and consequently torqued relative to the side wall 5. Thereby the tilting ledges 28, 29 are each pressed with one of their ends (depending on the direction of torsion) on the front and rear front face of side wall 5, such that these front faces consequently represent clamping faces 35 and the ends of the tilting ledges 28, 29 represent clamping edges 36. Through the pressing of the clamping edges 36 on the clamping faces 35 a blocking of the displaceability of the tilting part 26 occurs relative to the side wall 5, in which the clamping edges 36 can dig into the material of the clamping faces 35, such that a form-fit connection between tilting part 26 and side wall 5 is formed. To promote the digging-in or clawing-in of the clamping edges 36 into the clamping faces 35, the tilting part 26 is preferably implemented of a harder material than the side wall 5 with the reinforcement plate 27 fastened thereon.

In the event of a crash thereby a large portion of the forces acting in the direction of height adjustment can be absorbed through the cooperation of the tilting part 26 with the side wall 5. For example 25% of the occurring forces can be absorbed by the plates (in connection with the remaining friction faces, but which make a significantly smaller contribution compared to the plates) and 75% of the occurring forces through the engagement of the clamping edges 36 with the clamping faces 35.

The console unit 4 can be formed for example by a cast metal part, while the tilting part 26 can be of a high-tensile steel.

Due to the arcuate pivoting of the shell unit 3 relative to the console unit 4 the side walls 5 in the proximity of their front and rear front faces have an arcuate course adapted to this pivoting, as the tilting ledges 28, 29 preferably also have an arcuate course adapted thereto.

Instead of the engagement of an engagement element 30 into slot 31, a corresponding groove could also be provided or an engagement element could be provided overlapping the upper longitudinal edge of the shell unit 3.

The second embodiment example of the invention depicted in FIGS. 11 to 17 differs from the described first embodiment example of the invention in the implementation of the tilting part and the manner in which the tilting part 26 engages the shell unit 3. The remaining parts of the steering column and the securement device are developed identically to the described first embodiment example. The tilting part 26 is again disposed on the outside of one of the side walls 5, and the plates 17, 18 interdigitating in the manner of a sandwich are provided on the outside of the other side wall 5. On the outside of the tilting part 26 in this embodiment example, a plate-form transmission part 37 is disposed, which is penetrated by the tension bolt 11 through an elongated hole cutout 38, which is disposed approximately congruently with the elongated hole cutout 9 in the shell unit 3. Viewed in the axial direction of the steering spindle, before and after the side wall 5 outwardly projecting support bolts 39, 40 are secured on the shell unit 3, which penetrate through openings 41, 42 in the plate-form transmission part 37, whereby the transmission part 37 is held on the shell unit 3 unadjustably in the direction of the height adjustment and length adjustment of the steering spindle. The tilting part, again, comprises inwardly projecting tilting ledges 28, 29, which overlap the front sides of the side wall 5, with the side wall being displaceable in the direction of the height adjustment relative to the tilting part 26. On the outside of the tilting part 26 project transmission ledges 43, 44 (means for supporting the tilting part 26), which are parallel to the direction of the length adjustment of the steering column and overlap the upper and lower edge of the transmission part 37. The tilting part 26 is thereby fastened nondisplaceably in the direction of height adjustment on transmission part 37 and via it fastened on the shell unit 3, while it is displaceable in the direction of length adjustment relative to transmission part 37 and, consequently, relative to shell unit 3.

In the event of a crash a torque causing a torsion of the shell unit 3 about an axis of rotation 60 parallel to the axis of the tension bolt 11 and in the proximity of the securing elements is transmitted via transmission part 37 and transmission ledges 43, 44 (the means for supporting the tilting part 26 also being a means for transmitting torque) onto tilting part 26, whereby the clamping edges 36 of the tilting ledges are pressed against the clamping faces on the front and rear front side of side wall 5.

As is especially evident in FIG. 17, the tilting ledges 28, 29 have a course differing from a straight line, which course is adapted to the arcuate pivoting of the shell unit in the height adjustment of the steering column. The front and rear front side of the side wall 5, which forms the clamping faces 35, also has an arcuate course adapted to the pivoting in the height adjustment.

The third embodiment example of the invention depicted in FIGS. 19 to 24 differs from the previously described embodiment examples in particular in the manner of implementation of the tilting part, which in this embodiment example is disposed between the side wall 5 of the console unit 4 and the shell unit 3. Furthermore, in this embodiment example plate stacks of plates 17, 18 interdigitating and intersecting one another in the manner of a sandwich are disposed on the outsides of both side walls 5, although such interdigitating plate stacks can also be provided only on one side. These plates 17, 18 are fastened via appropriate holding bolts on the shell unit 3 (plates 18) or on the console unit 4 (plates 17).

The tilting part 26 is here developed in the manner of a frame, with the tension bolt 11 penetrating a large central opening of the circumferentially closed frame of the tilting part 26. On the side facing the side wall 5 of the tilting part 26, thus in this embodiment example on the outside, projecting tilting ledges 28, 29 are developed, which partially overlap the front and rear front sides of the side wall, partially project into a groove 45 on the inside of side wall 5. In this way, the tilting part 26 is again supported displaceably relative to side wall 5 in the direction of height adjustment.

On the inside facing the shell unit 3 the tilting part 26 comprises inwardly projecting transmission ledges 43, 44 (a means for supporting the tilting part 26), which overlap edges of the shell unit 3 extending in the direction of length adjustment and through which the tilting part is guided displaceably in the direction of length adjustment relative to shell unit 3, but, in the direction of height adjustment is connected with shell unit 3 such that it is nondisplaceable relative to it.

Through this development of the tilting part 26 a relatively narrow overall (construction) width of the steering column can be attained in this region.

In the event of a crash a torque is transmitted from the shell unit 3 via transmission ledges 43, 44 (the means for supporting the tilting part 26 also being a means for transmitting torque) onto tilting part 26, such that clamping edges 36 of tilting ledges 28, 29 become locked with corresponding clamping faces 35 of side wall 5, and in this case the clamping faces are formed by the front and rear front sides of the side wall 5 and of the side face of groove 45. The oblique transmission ledge 43 with the torsion of shell unit 3 relative to the console unit causes a resulting tension force for locking the plates.

The elongated hole 10 in side wall 5 in this embodiment example is disposed in an insert part 47 of synthetic material set into and secured in a corresponding cutout 46 in side wall 5. For clamping the two plate stacks, on the side of the tension bolt 11 opposing the tension lever 21 also a counterpressure plate 48 held by the tension nut 25 is disposed, which in the closed state of the tension device tensions the plates disposed on this side against the outside face of side wall 5.

In the embodiment example of the invention depicted in FIGS. 25 to 29 the tilting part 26 is, again, disposed between one of the side walls 5 and shell unit 3. The tilting part is here developed as a plate-form part, which is guided in a depression 49 on the inner face of side wall 5 displaceably in the direction of height adjustment. For this purpose the delimitation edges of the depression and the side edges of the plate-form tilting part are correspondingly developed in the form of an arc. On the inside facing the shell unit 3 the tilting part 26 comprises inwardly projecting transmission ledges 43, 44, which, on the one hand, overlap the lower longitudinal edge 32 of side face 12 of shell unit 3, on the other hand, are in contact on an obliquity 50 adjoining the upper end of side face 12. Through the transmission ledges 43, 44 (a means for supporting the tilting part 26) the tilting part is connected with shell unit 3 nondisplaceably in the direction of height adjustment, but displaceably relative to shell unit 3 in the direction of length adjustment. Upon a torsion of shell unit 3 in the event of a crash about an axis parallel to the longitudinal axis of tension bolt 11, consequently the tilting part 26 is entrained by the shell unit via these transmission ledges 43, 44 (the means for supporting the tilting part 26 also being a means for transmitting torque), whereby a torque can be transmitted onto the tilting part 26. With a torsion of tilting part 26 in depression 49 of shell unit 3 the corresponding two clamping edges 36 engage the side edges of depression 49, with these side edges 49 forming clamping faces 35. The displacement of tilting part 26 relative to side wall 5 is thereby blocked. The oblique transmission ledge 43 causes here also an additional clamping force of the plates in the torsion of the shell unit relative to the console unit.

A fifth embodiment example of the invention is depicted in FIGS. 30 to 38. In this embodiment example on the outside of one of side walls 5 are disposed interdigitating stacks of plates, on the outside of the other side wall 5 a tilting part 26 is provided, which is developed cross-form in end-on view. The vertical arms of the cross are developed in the form of plates and are guided displaceably in the direction of height adjustment in a depression 51 on the outside of side wall 5, which extends in the direction of height adjustment. The horizontal arms 53 (a means for supporting the tilting part 26) of the cross-form tilting part 26 are also developed plate-form and, with respect to the vertical arms 52, are located further outward and supported in a depression 54 in a transmission part 37 disposed on the outside of tilting part 26 displaceably in the direction of length adjustment of the steering column. On side face 12 of shell unit 3 before and after side wall 5 fastening extensions 55 are attached, which secure the transmission part 37 against a displacement relative to shell unit 3 in the direction of height adjustment as well as also in direction of length adjustment. In the transmission part 37 is developed an elongated hole cutout 38 penetrated by the tension bolt and the transmission part 37 is held on tension bolt 11 by the tension nut 25 and a large washer 56. Through the flanks delimiting the depression 54 in the upward and downward direction the tilting part 26 is secured against a displacement in the direction of height adjustment relative to shell unit 3.

With a torsion of shell unit 3 through a force applied onto the front end of the steering column about a virtual axis of rotation 60 (drawn in FIG. 32 by example) extending in the proximity of the securement unit parallel to the tension bolt, the transmission part 37, and through it the tilting part 26 by way of the arms 53 (the means for supporting the tilting part 26 also being a means for transmitting torque) arranged in the depression 54 of the transmission part 37, is also torqued, whereby the tilting part is locked relative to its guide path extending in the direction of vertical adjustment.

The upper vertical arm 52 of the tilting part comprises a cutout extending from its upper edge, whereby two fork-like extensions 57 are formed. In a torsion of tilting part 26 in recess 51, depending on the direction of rotation, one of the two extensions 57, by pressing on the flanks delimiting the depression 51, can be bent off in the developed in the form of plates and are guided displaceably in the direction of height adjustment in a depression 51 on the outside of side wall 5, which extends in the direction of height adjustment. The horizontal arms 53 (a means for supporting the tilting part 26) of the cross-form tilting part 26 are also developed plate-form and, with respect to the vertical arms 52, are located further outward and supported in a depression 54 in a transmission part 37 disposed on the outside of tilting part 26 displaceably in the direction of length adjustment of the steering column. On side face 12 of shell unit 3 before and after side wall 5 fastening extensions 55 are attached, which secure the transmission part 37 against a displacement relative to shell unit 3 in the direction of height adjustment as well as also in direction of length adjustment. In the transmission part 37 is developed an elongated hole cutout 38 penetrated by the tension bolt and the transmission part 37 is held on tension bolt 11 by the tension nut 25 and a large washer 56. Through the flanks delimiting the depression 54 in the upward and downward direction the tilting part 26 is secured against a displacement in the direction of height adjustment relative to shell unit 3.

With a torsion of shell unit 3 through a force applied onto the front end of the steering column about a virtual axis of rotation 60 (drawn in FIG. 32 by example) extending in the proximity of the securement unit parallel to the tension bolt, the transmission part 37, and through it the tilting part 26 by way of the arms (the means for supporting the tilting part 26 also being a means for transmitting torque) arranged in the depression 54 of the transmission part 37, is also torqued, whereby the tilting part is locked relative to its guide path extending in the direction of vertical adjustment.

The upper vertical arm 52 of the tilting part comprises a cutout extending from its upper edge, whereby two fork-like extensions 57 are formed. In a torsion of tilting part 26 in recess 51, depending on the direction of rotation, one of the two extensions 57, by pressing on the flanks delimiting the depression 51, can be bent off in the direction toward the other extension 57, as is shown in dashed lines in FIG. 35. The force, with which this takes place, can be set by the corresponding dimensioning of extensions 57. Thereby in the proximity of the prolongation of this extension 57 a clamping edge 36 is formed and an additional toothing is provided at this site (therefore a type of "multiple" clamping edge is provided). Through this toothing the clawing of the clamping edge 36 into the associated clamping face 35 is further augmented, wherein the clamping faces are formed by the side flanks delimiting the depression 51, viewed in the axial direction of the steering column, before and after tension bolt 11.

Figure 36:
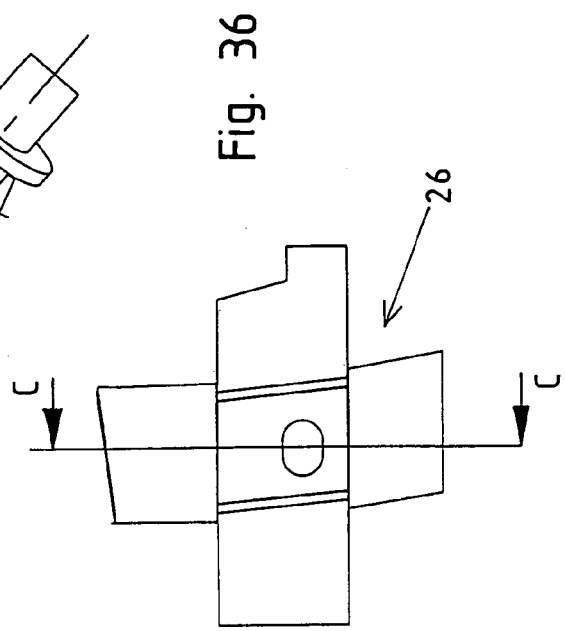
Figure 38:
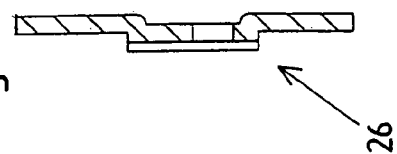
FIG. 38 is a section along line CC of FIG. 36.
Figure 37:
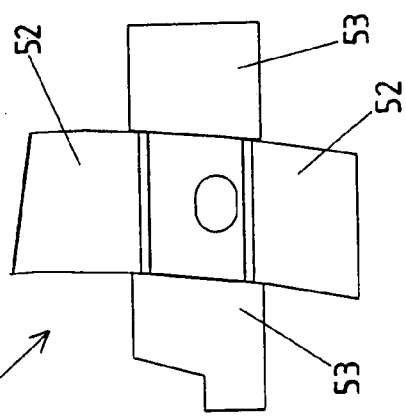
Figure 39:
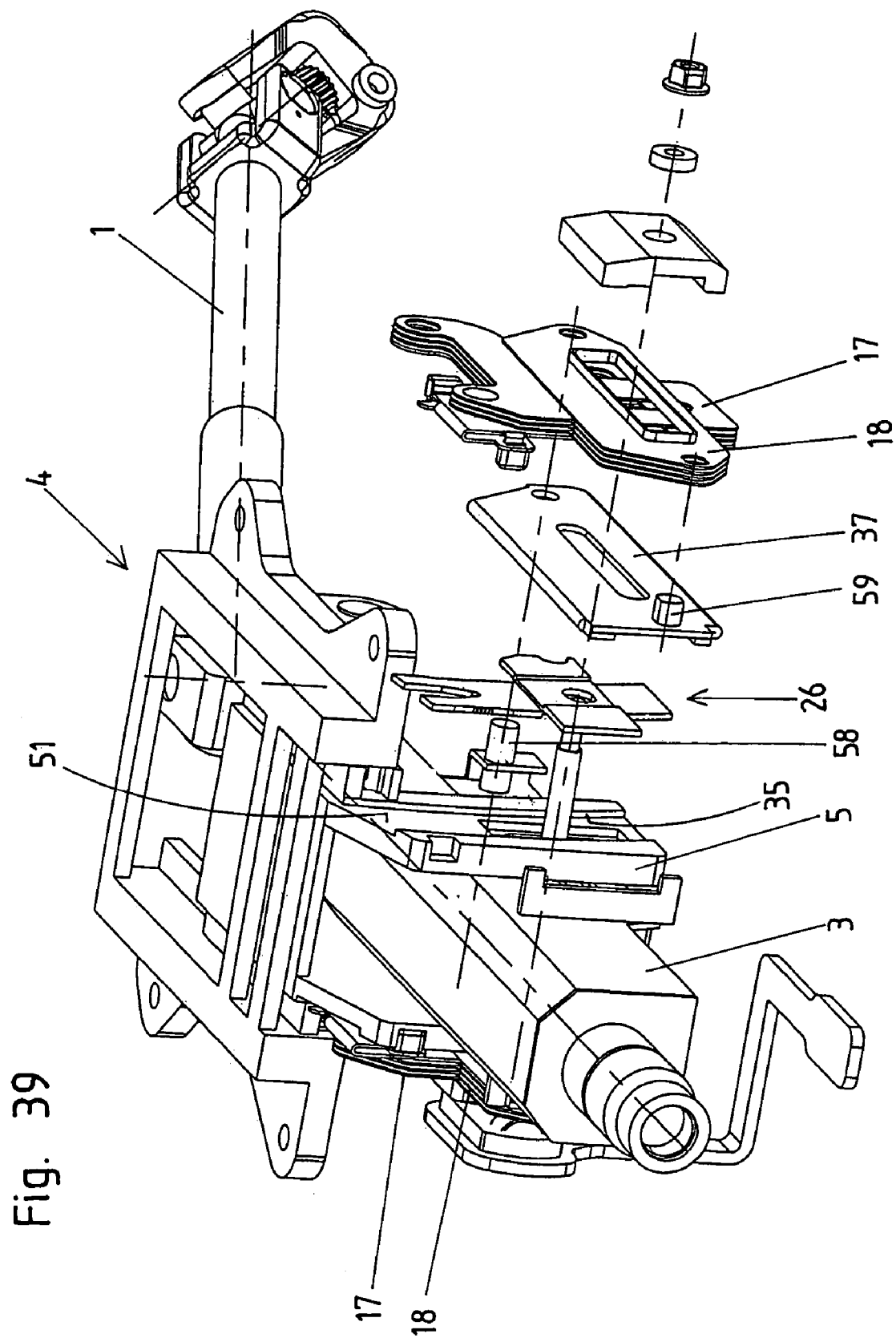
FIG. 39 is a perspective representation of a steering column according to a sixth embodiment example of the invention, with parts of the securement device pulled apart in the manner of an exploded representation.
Figure 40:
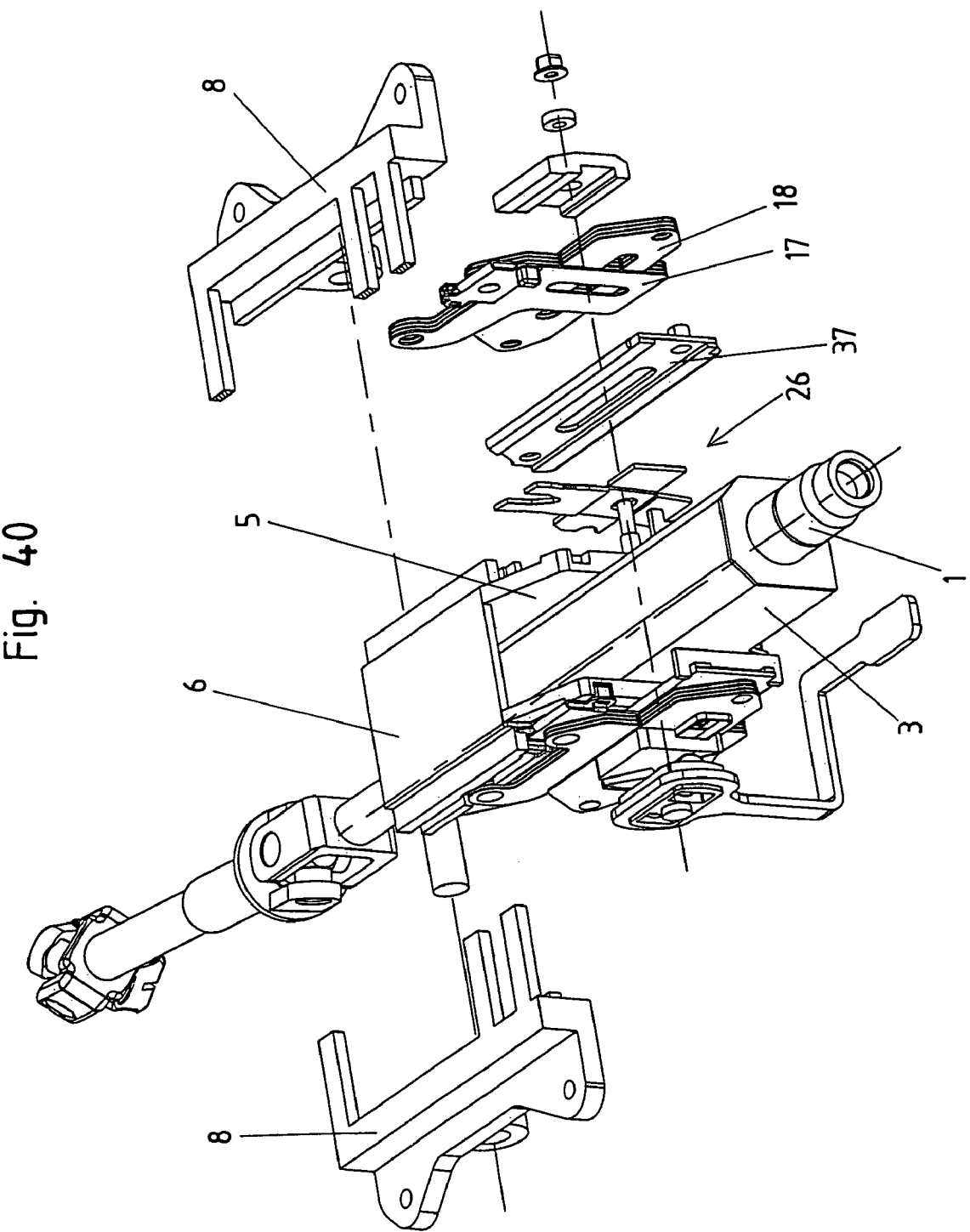
FIG. 40 is a representation corresponding to FIG. 39, but from a different angle of view and with the mounting part of the console unit sectioned longitudinally and pulled apart.
Figure 41:
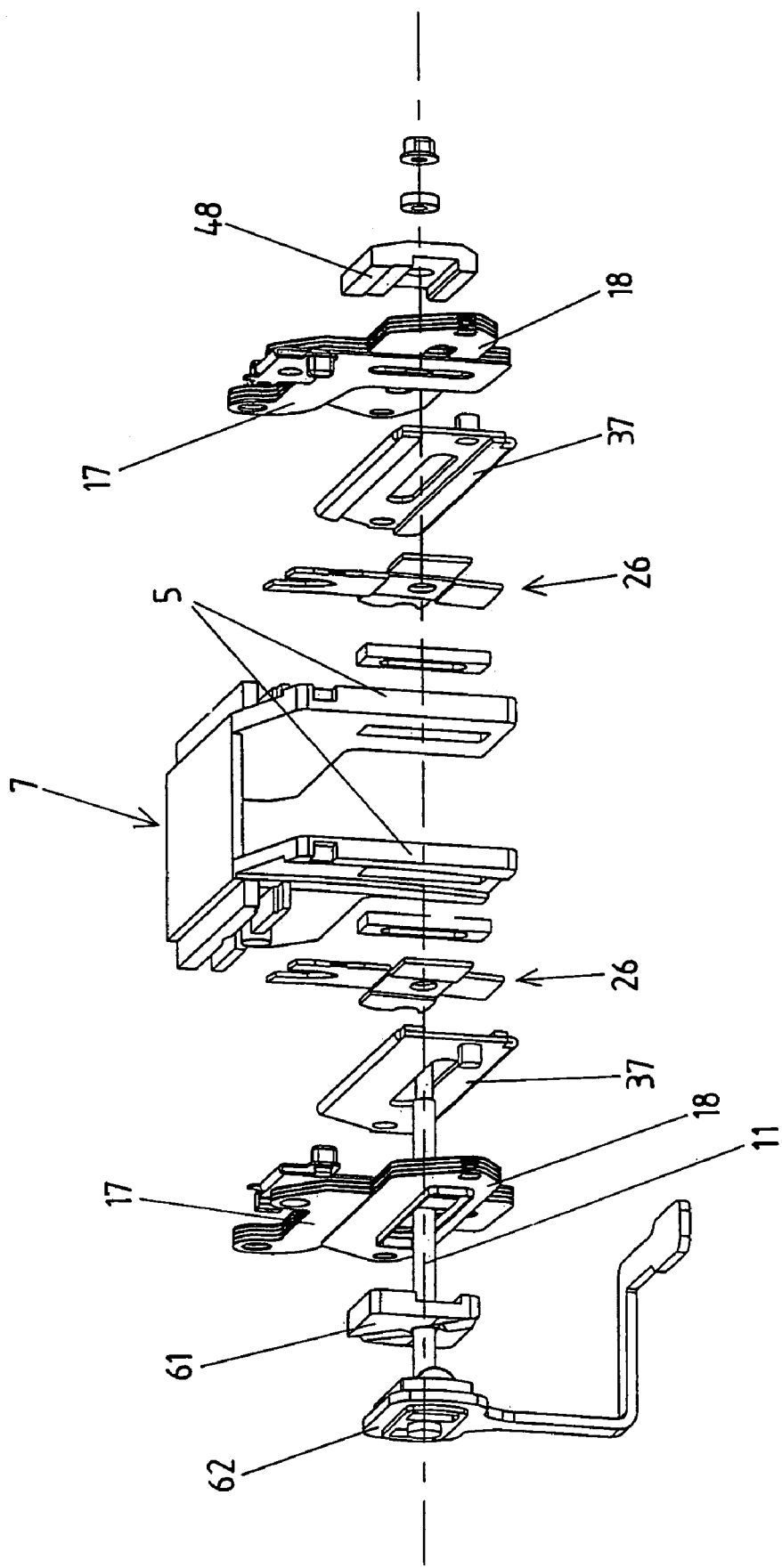
FIG. 41 is a perspective representation of the support part of the console unit and of parts of the securement device pulled apart in the manner of an exploded representation.
Figure 43:
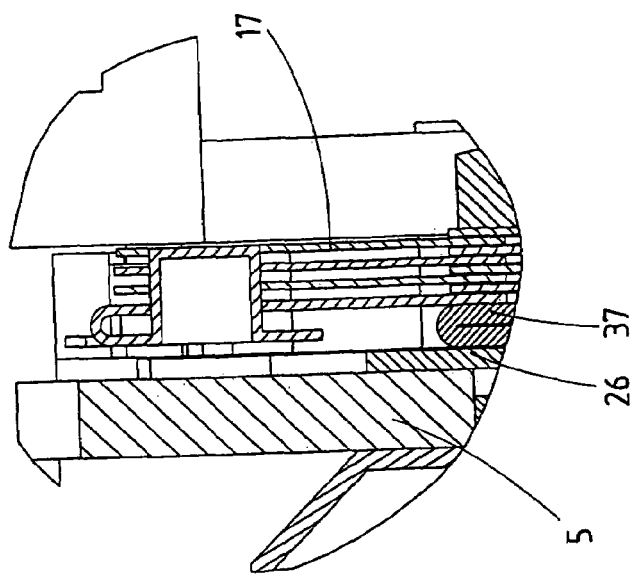
FIG. 43 is an enlarged detail D from FIG. 42.
Figure 42:
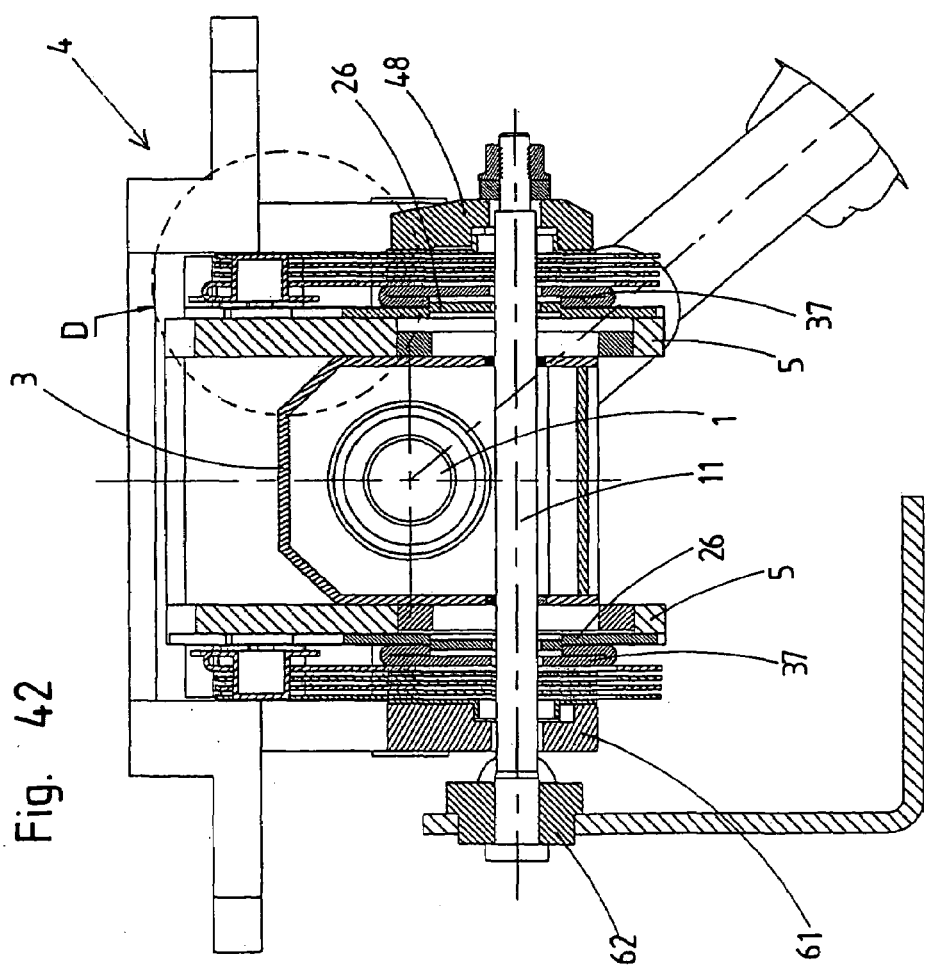
FIG. 42 is a cross section in the proximity of the tension bolt.

An implementation of the tilting part without such extensions 57 would also be possible. Such an implementation of the tilting part is depicted in FIGS. 36 to 38.

The edges of the vertical arms 52 of the tilting parts according to FIGS. 33 to 35 or 36 to 38 are developed corresponding to the arcuate path of the pivoting of the shell unit relative to the console unit in the adjustment of the steering column in the direction of height adjustment in the opened state of the securement device.

In the sixth embodiment example of the invention shown in FIGS. 39 to 43 a cross-form tilting part 26 is also provided, which analogously to the previously described fifth embodiment example of the invention (including the arms 53 being a means for supporting the tilting part 26, and also being a means for transmitting torque) is, on the one hand, supported in a depression 51 in side wall 5 displaceably in the direction of height adjustment, on the other hand, is supported in a depression in a transmission part 37 displaceably in the direction of length adjustment. But in this embodiment example such tilting parts 26 are disposed on the outsides of both side walls 5. Furthermore, on the outsides of both transmission parts 37 disposed on the outsides of the tilting parts 26 are disposed sandwich-like interdigitating stacks of packets 17, 18. The plates 17 comprising counterpressure plate 61 extending in the direction of height adjustment are herein fastened on support part 7 of console unit 4, with an innermost plate being fastened on the console unit and the other plates 17 on the innermost plate. Plates 18 comprising the elongated hole cutouts 20 extending in the direction of length adjustment are connected with shell unit 3 nondisplaceably in the direction of height adjustment and in the direction of length adjustment, preferably as much as possible free of tolerance. For this purpose a holding bolt 58 is provided disposed on the shell unit 3, which penetrates rearside openings in plates 18 and by which also the transmission part 37 is penetrated through a rearside opening. On the other hand, on transmission part 37 a holding bolt 59 is provided, which penetrates front openings in plates 18. Plates 18 can herein be disposed on the holding bolts 58, 59 displaceably in the axial direction, and for the tolerance-free securement of the shell unit in the closed state of the securement device at least one of the holding bolts 58, 59, preferably holding bolt 58, penetrates with minimum tolerance the associated openings in plates 18. Analogously the plates 17 can also be connected with the console unit 4 such that at least one holding bolt penetrates tolerance-free openings in plates 17, and, relative to a second holding bolt, they can have tolerance.

With respect to a center plane extending through the steering spindle 1, the embodiment example depicted in FIGS. 39 to 43 has a mirror-symmetrical structure, whereby a symmetric application of holding forces becomes possible. Due to the bilateral disposition of tilting parts 25 [sic: 26], only half the force acts onto each side wall 5 in comparison to a one-sided disposition, such that the side walls 5 can be implemented to be less robust.

Different modifications of the embodiment examples shown are conceivable and possible without leaving the scope of the invention. For example, the number of plates 17, 18 can be increased or decreased or such plates can be omitted altogether, if the requisite holding forces can also be applied without such plates. The securing elements would in this case be formed by friction faces in contact on one another of the parts, and through the inventive tilting part an additional holding force is applied with a resulting deformation of the shell unit through a force acting in the proximity of its front end.

Instead of engagement elements acting with friction closure, it would moreover also be conceivable and possible to provide engagement elements form-fittingly engaging one another in the closed state of the tension device. Such elements can be formed for example by toothings meshing with one another. Especially if these toothings are developed relatively small in order to permit a small raster of the adjustment, the overall applicable holding forces can be significantly increased through a tilting part according to the invention.

Although the use of an inventive tilting part in the depicted embodiment examples has been explained in connection with the height adjustment, in which such tilting part is considered to be especially advantageous, such a tilting part could also be could also be employed in connection with the length adjustment of the steering column. In this case the tilting part would be guided displaceably in the direction of length adjustment on the shell unit or the side wall and secured on the other of the two parts against a displacement in the direction of length adjustment. With an occurring deformation of the shell unit 3 under pivoting of the same about a virtual axis of rotation 60 located in the proximity of the securement device relative to the at least one side wall 5, again, analogously a pivoting of the tilting part relative to its guidance in the direction of the length adjustment could be attained, whereby clamping edges would be brought into engagement with clamping faces, such that the displacement in the direction of length adjustment is blocked.

It would also be conceivable and possible in principle to support a tilting part acting in the direction of height adjustment on the shell unit 3, or on a part connected herewith, such that it is displaceable in the direction of height adjustment and to secure it on the side wall 5, or a part connected herewith, nondisplaceably in the direction of height adjustment.

LEGEND TO THE REFERENCE NUMBERS

1 Steering spindle
2 Universal joint
3 Shell unit
4 Console unit
5 Side wall
6 Support plate
7 Support part
8 Mounting part
9 Elongated hole
10 Elongated hole
11 Tension bolt
12 Side face
13 Longitudinal axis
14 Longitudinal axis
15 Front end
17 Plate
18 Plate
19 Elongated hole
20 Elongated hole
21 Tension lever
22 Head
23 Roller
24 Depression
25 Tension nut
26 Tilting part
27 Reinforcement plate
28 Tilting ledge
29 Tilting ledge
30 Engagement element
31 Guidance slot
32 Longitudinal edge
33 Double arrow
34 Double arrow
35 Clamping face
36 Clamping edge
37 Transmission part
38 Elongated hole cutout
39 Support bolt
40 Support bolt
41 Opening
42 Opening 43 Transmission ledge
44 Transmission ledge
45 Groove
46 Cutout
47 Insert part
48 Counterpressure plate
49 Depression
50 Obliquity
51 Depression
52 Art
53 Art
54 Depression
55 Fastening extension
56 Washer
57 Extension
58 Holding bolt
59 Holding bolt
60 Axis of rotation
61 Counterpressure plate
62 Tension plate
63 Axle
64 Link plate

The invention claimed is:

1. An adjustable steering column comprising:
a steering spindle;
a shell unit housing said steering spindle;
a console unit having at least one side wall which extends in a lateral direction along said shell unit, said shell unit being supported by said at least one side wall, said console unit being fixed to a chassis; and
a securement device operable between an engaged state and a disengaged state, said securement device including
a plurality of securing elements,
a tension bolt penetrating openings in said shell unit and in said at least one side wall, wherein said shell unit, said console unit, said plurality of securing elements and said tension bolt have a structure and are arranged such that when said securement device is in said engaged state, said shell unit is unadjustably coupled with said console unit by said securing elements engaging one another, and when said securement device is in said disengaged state, said shell unit is adjustable relative to said console unit in at least one adjustment direction, and
a tilting part having means for supporting said tilting part so as to be displaceable relative to a first one of said shell unit and said at least one side wall in one of said at least one adjustment direction, and so as to be nondisplaceable relative to a second one of said shell unit and said at least one side wall in said one of said at least one adjustment direction,
wherein one of (a) said tilting part and (b) said first one of said shell unit and said at least one side wall includes clamping edges, and the other of (a) said tilting part and (b) said first one of said shell unit and said at least one side wall includes clamping faces,
and wherein said means for supporting said tilting part is further a means for transmitting a torque from said second one of said shell unit and said at least one side wall to said tilting part during torsion caused by deformation of said steering column, of at least a portion of said shell unit in a proximity of said at least one side wall, relative to said at least one side wall about an axis of rotation which is parallel to said tension bolt and located in a proximity of said securement device such that said tilting part is torqued by said second one of said shell unit and said at least one side wall relative to said first one of said shell unit and said at least one side wall such that said clamping edges dig into said clamping faces so as to inhibit a displacement of said tilting part in said one of said at least one adjustment direction.

2. An adjustable steering column according to claim 1, wherein said means for supporting said tilting part includes at least one engagement element, and wherein said tilting part and said second one of said shell unit and said at least one side wall are connected via said at least one engagement element and at least two engagement points spaced apart from one another.

3. An adjustable steering column according to claim 1, wherein said tilting part includes said clamping edges, and said first one of said shell unit and said at least one side wall includes said clamping faces.

4. An adjustable steering column according to claim 1, wherein said one of said at least one adjustment direction is a height direction perpendicular to a longitudinal axis of said steering column.

5. An adjustable steering column according to claim 1, wherein said at least one adjustment direction in which said shell unit is adjustable relative to said console unit includes an axial direction of said steering column and a height direction perpendicular to a longitudinal axis of said steering column.

6. An adjustable steering column according to claim 5, wherein said tilting part is supported so as to be nondisplaceable relative to said second one of said shell unit and said at least one side wall in one of said axial direction and said height direction, and so as to be displaceable relative to said second one of said shell unit and said at least one side wall in the other of said axial direction and said height direction.

7. An adjustable steering column according to claim 1, wherein said tilting part is supported so as to be nondisplaceable relative to said shell unit in a height direction perpendicular to a longitudinal axis of said steering column, and so as to be displaceable relative to said at least one side wall in said height direction.

8. An adjustable steering column according to claim 1, wherein said tilting part has a central opening which is penetrated by said tension bolt.

9. An adjustable steering column according to claim 1, wherein said means for supporting said tilting part includes transmission ledges overlapping edges of said shell unit in an axial direction of said steering column,
and wherein said tilting part further comprises:
tilting ledges overlapping edges of one of said at least one side wall in a height direction perpendicular to a longitudinal axis of said steering column, wherein at least one of said tilting ledges at least partially engages a groove in said one of said at least one side wall in said height direction.

10. An adjustable steering column according to claim 1, wherein said tilting part is positioned between one of said at least one side wall and said shell unit.

11. An adjustable steering column according to claim 10, wherein said tilting part is guided in a depression on a surface of said one of said at least one side wall facing said shell unit, wherein flanks defining said depression and extending in a height direction perpendicular to a longitudinal axis of said steering column comprise said clamping faces.

12. An adjustable steering column according to claim 10, wherein said means for supporting said tilting part includes transmission ledges overlapping edges of said shell unit in an axial direction of said steering column.

13. An adjustable steering column according to claim 1, wherein said tilting part is positioned at a surface of one of said at least one side wall facing away from said shell unit.

14. An adjustable steering column according to claim 13, further comprising:
a transmission part nondisplaceably connected in said one of said at least one adjustment direction to a surface of said tilting part facing away from said shell unit, said transmission part being connected to said shell unit so as to be nondisplaceable at least in said one of said at least one adjustment direction.

15. An adjustable steering column according to claim 14, wherein said transmission part is connected to said shell unit so as to be nondisplaceable in an axial direction of said steering column, and in a height direction perpendicular to a longitudinal axis of said steering column.

16. An adjustable steering column according to claim 14, wherein said at least one adjustment direction includes an axial direction of said steering column and a height direction perpendicular to a longitudinal axis of said steering column, said transmission part is nondisplaceably connected to said surface of said tilting part in one of said axial direction and said height direction, and wherein said tilting part includes transmission ledges extending in the other of said axial direction and said height direction.

17. An adjustable steering column according to claim 14, wherein said means for supporting said tilting part comprises:
first arms extending in said one of said at least one adjustment direction; and
second arms extending in another of said at least one adjustment direction.

18. An adjustable steering column according to claim 17, wherein said tilting part is supported in a depression on a surface of said one of said at least one side wall facing away from said shell unit so as to be displaceable in said one of said at least one adjustment direction, wherein flanks defining said depression comprise said clamping faces, and wherein said first arms extending in said one of said at least one adjustment direction comprises said clamping edges.

19. An adjustable steering column according to claim 18, wherein at least one of said first and second arms comprises extensions separated by a cutout portion, said extensions being bendable towards each other so as to form said clamping edges upon deformation of said steering column.

20. An adjustable steering column according to claim 19, wherein said extensions include toothed sections in a region to be bent so as to form said clamping edges.

21. An adjustable steering column according to claim 17, wherein said second arms are displaceably supported in a depression extending in said another of said at least one adjustment direction in said transmission part, wherein side flanks of said depression comprise engagement elements for a nondisplaceable connection of said tilting part with said transmission part in said one of said at least one adjustment direction.

22. An adjustable steering column according to claim 13, wherein said means for supporting said tilting part comprises:
engagement elements positioned at two opposite sides of said one of said at least one side wall in an axial direction of said steering column, said engagement elements extending from said tilting part toward said shell unit, wherein said engagement elements overlap at least one of an edge of said shell unit extending in said axial direction and a guidance slot in said shell unit extending in said axial direction.

23. An adjustable steering column according to claim 22, wherein said tilting part further comprises:
tilting ledges overlapping said sides of said one of said at least one side wall, said engagement elements being positioned on said tilting ledges, wherein said tilting ledges comprise said clamping edges, and wherein said sides of said one of said at least one side wall comprise said clamping faces.

24. An adjustable steering column according to claim 1, wherein said console unit comprises two side walls, said shell unit being positioned between said two side walls.

25. An adjustable steering column according to claim 24, wherein said tension bolt penetrates openings in both of said side walls.

26. An adjustable steering column according to claim 24, wherein said tilting part comprises at least one tilting part provided at each of said side walls.

27. An adjustable steering column according to claim 1, wherein said securing elements comprise:
a first plurality of plates connected with said shell unit; and
a second plurality of plates connected with said console unit, said plates of said first and second plurality of plates having friction faces and being interdigitated with each other.

28. An adjustable steering column according to claim 1, further comprising:
a tensioning device for mutually engaging said securing elements, said tensioning device being actuatable by a tension lever.

* * * * *